US009065665B1

(12) United States Patent
Fritz

(10) Patent No.: US 9,065,665 B1
(45) Date of Patent: Jun. 23, 2015

(54) CONFERENCING SYSTEM WITH SEAMLESS CONNECTION

(75) Inventor: Kent Fritz, Mountain View, CA (US)

(73) Assignee: Shoretel, Inc., Sunnyvale, CA (US)

( * ) Notice: Subject to any disclaimer, the term of this patent is extended or adjusted under 35 U.S.C. 154(b) by 163 days.

(21) Appl. No.: 12/815,117

(22) Filed: Jun. 14, 2010

(51) Int. Cl.
*H04L 12/18* (2006.01)

(52) U.S. Cl.
CPC ........ *H04L 12/1818* (2013.01); *H04L 12/1822* (2013.01); *H04L 12/1827* (2013.01)

(58) Field of Classification Search
USPC .......................... 370/260, 261, 262, 265, 271
See application file for complete search history.

(56) References Cited

U.S. PATENT DOCUMENTS

| | | | | |
|---|---|---|---|---|
| 5,590,127 | A * | 12/1996 | Bales et al. .................... 370/260 |
| 6,914,964 | B1 * | 7/2005 | Levine ............................ 379/52 |
| 6,975,622 | B2 * | 12/2005 | Korycki et al. ............... 370/352 |
| 2006/0149815 | A1 * | 7/2006 | Spradling et al. ............. 709/205 |
| 2007/0073880 | A1 * | 3/2007 | Krishnakumar et al. ..... 709/225 |
| 2007/0263830 | A1 * | 11/2007 | Wengrovitz et al. .......... 379/219 |
| 2008/0279118 | A1 * | 11/2008 | Hyun et al. .................... 370/260 |
| 2009/0252063 | A1 * | 10/2009 | Owen et al. ................... 370/255 |

* cited by examiner

*Primary Examiner* — Dang Ton
*Assistant Examiner* — Robert M Morlan
(74) *Attorney, Agent, or Firm* — Patent Law Works LLP

(57) ABSTRACT

A conference call system with a plurality of endpoints, a switch and a conference bridge is described. A first endpoint participating in a call authenticates a second endpoint for the call by transmitting to the switch a request to authenticate the second endpoint for the call. The second endpoint is authenticated without the user of second endpoint inputting the authentication data. Additionally, a voice call is upgraded to a collaboration call, i.e. a call with an associated visual presentation, through an upgrade request. The first endpoint transmits the upgrade request and consequently the collaboration bridge creates a visual presentation for the upgraded call. A link to the presentation is then transmitted to a call manager associated with the first endpoint.

34 Claims, 16 Drawing Sheets

CONFERENCING SYSTEM WITH SEAMLESS CONNECTION

BACKGROUND OF THE INVENTION

1. Field of the Invention

This invention relates to systems and methods for supporting telephony features on a Voice over Internet Protocol (VoIP) network. In particular, the present invention relates to conference call features supported in a VoIP network.

2. Description of the Background Art

A fundamental consideration when setting up a conference call is access control. A user can join a conference call by dialing in a conference call number. Additionally, to ensure that only authorized users join the conference call, the user is required to enter a password or a personal identification number to join the call. This security feature prevents unauthorized personnel from participating in the call. However, the password requirement can also prevent some of the intended participants from joining the call. Participants often find it unwieldy to determine the phone number and the password for the call. One solution to this problem is to email the phone number and password to the intended participants. However, participants may not have access to email when they are ready to join the conference call. Moreover, distributing password in any written form involves the risk of security leaks.

Additionally, the conference call solutions currently available do not provide the participants with much needed flexibility. For example, participants involved in a conference call cannot start a visual presentation session associated with the call. At best, the participants can employ separate solutions that involve cumbersome setup overhead for the participants. Furthermore, many such enhanced features must be set up and authorized before the call and cannot be initiated once the call has started.

SUMMARY OF THE INVENTION

A conference call system comprises a plurality of endpoints, a switch, a collaboration bridge and a conference bridge. The endpoint comprises an endpoint controller, a third party authentication module, a call upgrade module, an endpoint UI module and a call park endpoint module. The endpoint controller directs other modules in the endpoint to implement their functions at the appropriate times. The third party authentication module receives a request from the user to authenticate another user for the call and transmits the request to the switch. The call upgrade endpoint module receives a request to upgrade the call to a collaboration call and transmits the request to the switch. The endpoint UI module updates the user interface on endpoint according to the state of the call and various features being accessed for the call. The call park endpoint module receives the park/unpark requests from the user and transmits the requests to the switch.

The switch comprises a switch controller, a collaboration bridge determination module, an authentication module, a call upgrade switch module, a call park switch module, an authentication database and a permissions database. The switch controller directs other modules in the switch to implement their functions at the appropriate times. The collaboration bridge determination module determines the collaboration bridge for a collaboration call when the switch receives a collaboration call request or an upgrade to collaboration call request. The authentication module determines the authentication data for call participants that are being authenticated by other call participants. The authentication database stores authentication information for various call participants. The call upgrade switch module requests the collaboration bridge determination module to determine an appropriate collaboration bridge and then requests the determined collaboration bridge to create a visual presentation for the collaboration call. A link to the visual presentation is eventually transmitted to the call manager associated with the participating endpoint. Unlike other available solutions, the illustrated system beneficially provides a link to the presentation after the user makes a call. The user therefore need not save a separate link before the call and worry about searching for the saved link during the call. The call park switch module determines the permissions associated with the endpoint where call park is requested and associates those permission with the endpoint at which the call unpark is requested. The permissions database stores the permissions associated with various endpoints.

The collaboration bridge comprises a collaboration bridge controller, a call upgrade bridge module, a collaborated presentation bridge module and a collaboration bridge authentication module. The collaboration bridge controller directs other modules in the collaboration bridge to implement their functions at the appropriate times. The call upgrade bridge module receives a request to upgrade the call, requests the collaborated presentation bridge module to create a visual presentation for the call, receives a link for the requested visual presentation from the collaborated presentation module and transmits the link to collaboration bridge controller. The collaborated presentation bridge module creates a visual presentation responsive to receiving a request for the presentation. The collaboration bridge authentication module authenticates the participating endpoints for the call.

In one embodiment, the entities described above implement one or more methods to authenticate another party for the call, upgrade a call to a collaboration call, transfer permissions from a park requesting endpoint to unpark requesting endpoint and update interface on endpoints to request features related to the described methods. Additionally, the entities described above also transfer permissions from a transfer requesting endpoint to the endpoint where the call is transferred.

BRIEF DESCRIPTION OF THE DRAWINGS

The invention is illustrated by way of example, and not by way of limitation in the figures of the accompanying drawings.

Figure 1:
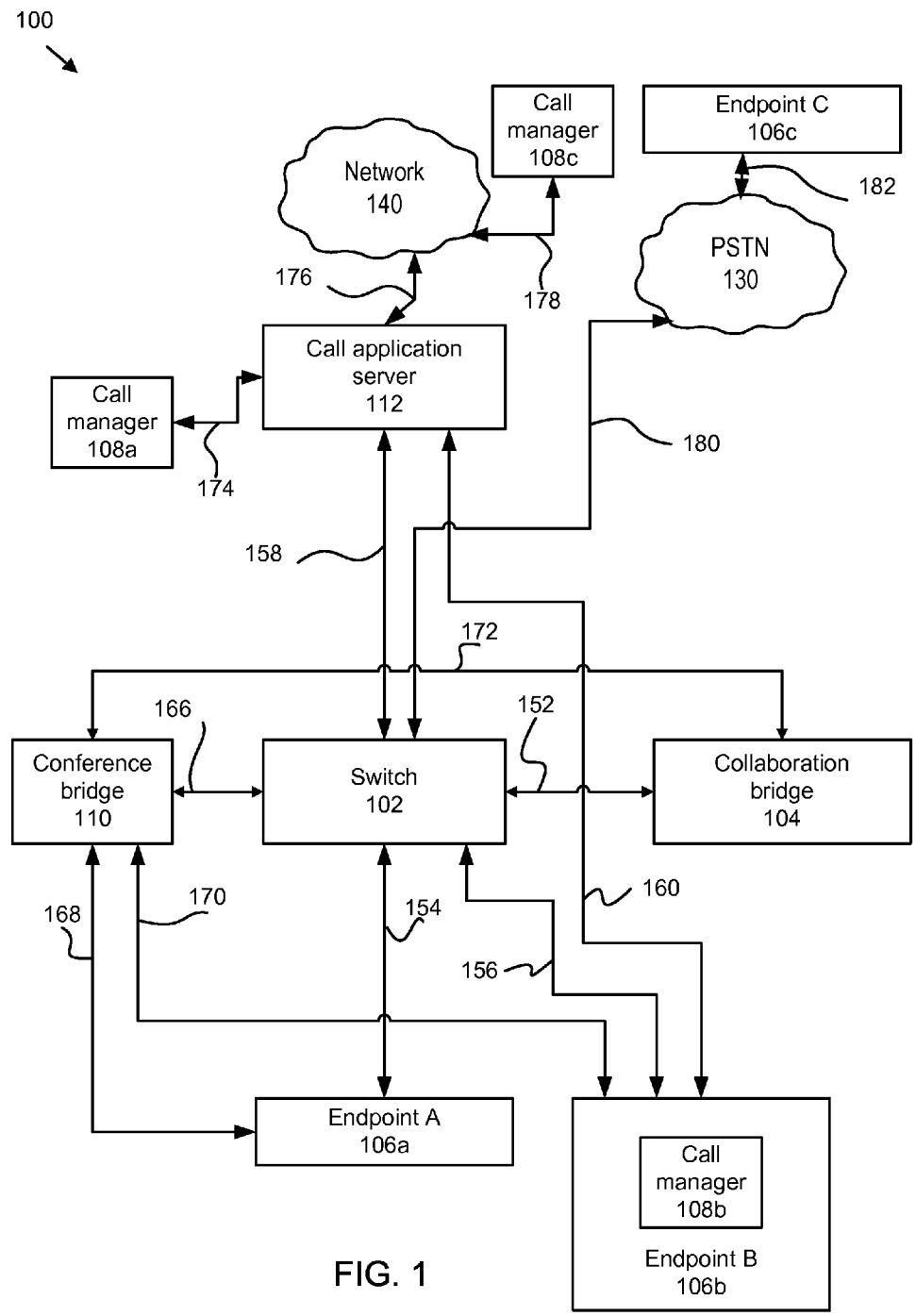
FIG. 1 is a block diagram illustrating a distributed conferencing system according to one embodiment of the present invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the telecommunication arts to most effectively convey the substance of their work to others skilled in the art. An algorithm is here, and generally, conceived to be a self-consistent sequence of steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose computing systems including a processor, memory, non-volatile storage, input device and output device may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 2:
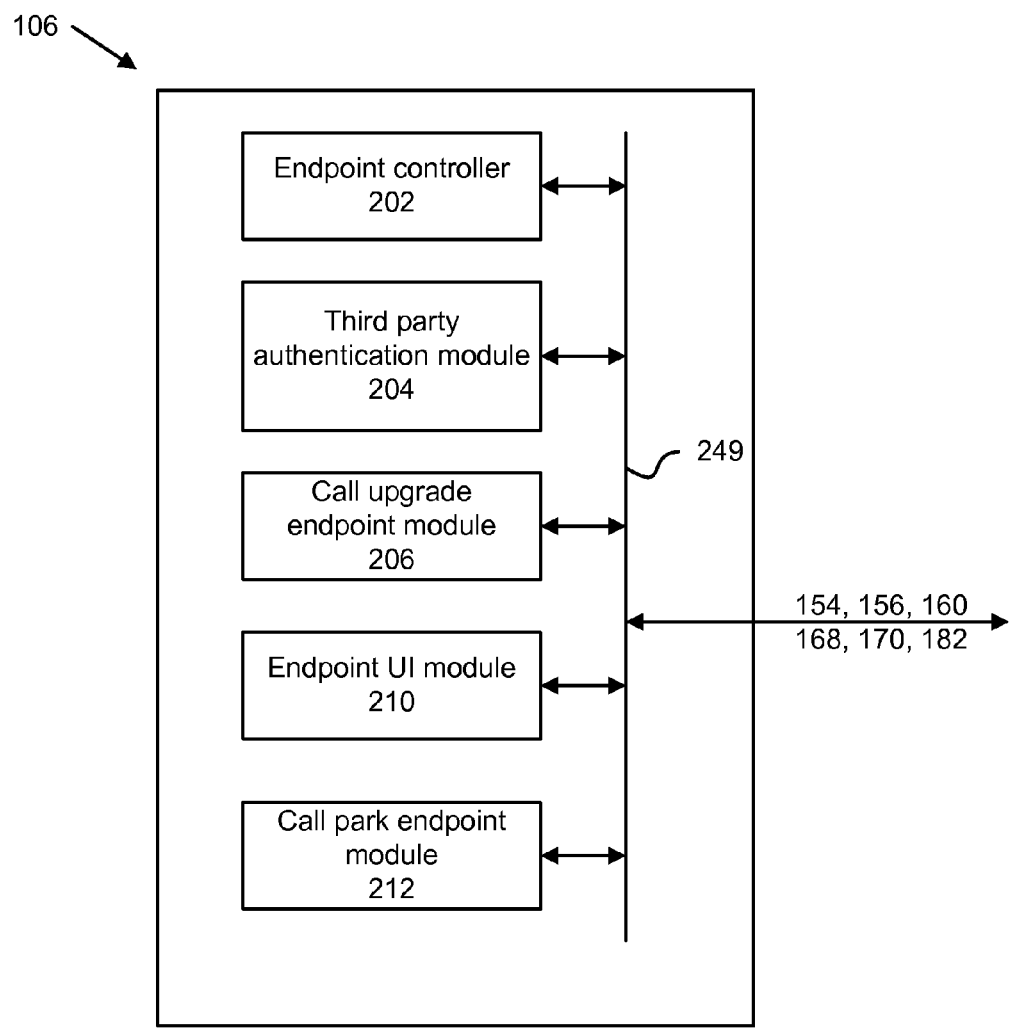
FIG. 2 is a block diagram illustrating an endpoint according to one embodiment of the invention.

The figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed. For example, FIG. 2 illustrates various modules in endpoint 106 that impute intelligence to endpoint 106. In an alternate embodiment, all or part of the functionality of modules like third party authentication module 204 can be implemented in switch 102, collaboration bridge 104 or conference bridge 110. Accordingly, embodiments of the illustrated system and various features supported by the system can function even with analog endpoints or dumb endpoints that do not include modules like third party authentication module 204.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

Also, some embodiments of the invention may be further divided into logical modules. One of ordinary skill in the art will understand that these modules can be implemented in hardware, firmware and/or software. In one embodiment, the modules are implemented in form of computer instructions stored in a computer readable storage medium when executed by a processor cause the processor to implement the functionality of the module. Additionally, one of ordinary skill in the art will recognize that a computer or another machine with instructions to implement the functionality of one or more logical modules is not a general purpose computer. Instead, the machine is adapted to implement the functionality of a particular module. Moreover, the machine embodiment of the invention physically transforms the electrons representing various user requests, media or other tangible objects from one state to another in order to attain the desired result.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Moreover, various telephony features in this specification are described in the context of two users connected on a call. One of ordinary skill in the art will understand that the number of users on a call does not limit the disclosed features and a call with two users is used for illustration purposes only.

System Overview

Systems and methods for seamlessly authenticating call participants and upgrading a call to a collaboration call are described. A participant through an endpoint makes a call and invites another participant to the call. The invited call participant need not dial into the conference call or provide an authentication code even if the conference call requires an authentication code. The inviter's endpoint seamlessly provides the conference call number and/or any required authentication code.

Additionally, if the conference call participants decide to upgrade the call to a collaboration call, i.e. start an associated visual presentation session, one of the participants selects the upgrade feature on the phone. Throughout the description, the phones or the endpoints are illustrated to include one or more interfaces for various telephony features. One of ordinary skill in the art will understand that some or all of these features can be accessed from the call manager associated with the endpoint. Accordingly, the endpoints need not include the interfaces for the supported telephony features.

The requesting participant's endpoint receives the request and forwards the request to the switch. The switch determines a suitable collaboration bridge for the upgrade request and requests a visual presentation session from the collaboration bridge. The collaboration bridge creates the requested presentation and transmits a link for the requested session to the switch. The switch then transmits the received link to the call managers associated with the participant's endpoints.

The call participants can also park a call at one endpoint and unpark the call at another endpoint. When the call participant unparks the call at another endpoint, the permissions associated with the previous endpoint or the call participant are transferred to the endpoint at which the call is unparked. Similarly, when a call is transferred from one endpoint to another, the permissions associated with the transferring endpoint or participant are transferred to the endpoint receiving the call.

Conferencing System 100

Referring now to FIG. 1, a conference system 100 comprises a switch 102, a collaboration bridge 104, endpoints 106a-c, call managers 108a-c, a conference bridge 110 and a call application server 112. In one embodiment, the conference bridge 110, switch 102 and collaboration bridge 104 do not exist as separate physical entities in conference system 100. Instead, the three entities exist as one combined entity that performs the functions of the conference bridge 110, the switch 102 and the collaboration bridge 104. Similarly, in some embodiments, other illustrated entities exist as a combined physical entity or a single illustrated entity is separated into more than one physical entity.

The conference bridge 110 hosts conference calls and stores information for various conference calls. The conference bridge 110 is communicatively coupled to switch 102 through communication bus 166, to endpoints 106a-b through communication buses 168, 170 and to collaboration bridge 104 through communication bus 172. A communication bus is a communication channel used in the art to exchange electronic signals. The conference bridge 110 transmits and receives call signals, over various communication busses 166-172, to and from various other entities in the conference system 100, to set up the conference call. In another embodiment, the conference bridge 110 receives media from various participating endpoints 106a-b, mixes the media and transmits the mixed media to participating endpoints 106a-b. In yet another embodiment, the conference bridge 110 stores information about endpoints 106a-b participating in a conference call being hosted by conference bridge 110. The information includes an identification string associated with participating endpoints 106a-b and optionally stores authentication data associated with endpoints 106a-b.

The switch 102 is an electronic switch, a digital switch, a soft switch or any other switch used to route phone calls and IP control signals. In one embodiment, switch 102 receives the media data from various call participants, mixes the media data, and transmits the mixed data to call participants. The switch 102 is communicatively coupled to endpoints 106a-b through communication buses 154 and 156, to call application server 112 through communication bus 158, to PSTN 130 through communication bus 180, to collaboration bridge 104 through communication bus 152 and to conference bridge 110 through communication bus 166. Switch 102 is further described with reference to FIG. 3 below.

The collaboration bridge 104 receives a request for a collaborated session from the switch 102 and creates a visual presentation for the collaborated session. The visual presentation comprises an interface that allows the participants of the collaborated session to upload an electronic file and share it with other call participants. In one embodiment, the visual presentation also indicates the status of various call participants in the collaborated session. In another embodiment, the visual presentation comprises the desktop screen or the application screen displayed on the call manager 108 associated with a participant's endpoint 106. The collaboration bridge 104 creates a link to the visual presentation and transmits the link to switch 102. In one embodiment, the transmitted link is a Uniform Resource Locator (URL). Additionally, in one embodiment, the collaboration bridge 104 also mixes the media for the conference call or takes over the media mixing role from the conference bridge 110. The collaboration bridge 104 is communicatively coupled to switch 102 through communication bus 152 and to the conference bridge 110 through communication bus 172. The collaboration bridge 104 is further described below with reference to FIG. 4.

The call managers 108a-c manage a user's calls and support various communication features associated with the user's call. For example, the call managers 108a-c supports one or more of the following features: visual presentation, voicemail, video conferencing, instant messaging and managing user settings. The call managers 108 a-c displays a user interface and the user can access one or more supported features from the user interface of the call managers 108a-c. For example, the call managers 108a-c receive from switch 102 a link for a visual presentation associated with a call. In one embodiment, the call managers 108a-c receive the visual presentation link from the call application server 112 that acts as an interface between the switch 102 and the call managers 108a-c. Regardless of how the call managers 108a-c receive the link, the call managers 108a-c display the link to the user and display the visual presentation in response to the user selecting the link. The call managers 108a-c are a client application or a web application stored in memory and executed by a processor. One of ordinary skill in the art will understand that the number of call managers 108a-c may vary in different embodiments of conferencing system 100 and the three call managers 108a-c in this embodiment of the conferencing system 100 are for illustrative purposes only. The number of call managers 108a-c should not be read as limiting to the conferencing system 100. Additionally, in one embodiment, the call manager 108b is part of endpoint 106b. In another embodiment, the call manager 108a is a physical entity separate from endpoint 106a. The call managers 108a-b are communicatively coupled to call application server 112 through communication buses 160 and 174. The call manager 108 in other networks 140 is coupled to the application server 112. For example, the call manager 108c is communicatively coupled to network 140 through communication bus 178 and the network 140 is communicatively coupled to call application server 112 through communication bus 176.

The call application server 112 provides an interface between switch 102 and call managers 108a-c. The call application server 112 receives the link to collaboration presentation from switch 102 and transmits the link to the call managers 108a-c. The call application server 112 is communicatively coupled to the switch 102 through communication bus 158, to network 140 through communication bus 176 and to call managers 108a-b through communication busses 160 and 174.

Endpoints 106a-c enable a user to carry on a phone call. Examples of endpoints include a video conferencing device, a multipoint control unit (MCU), a conference bridge, an analog terminal adapter (ATA), a computing device configured to execute the functionality of an endpoint 106a-c, analog phone attached to a switch port, and any other device that originates and/or terminates a media stream. In one embodiment, endpoint 106b also includes the call manager 108b. Additionally, one or more of the illustrated endpoints 106a-c can support signaling call control protocols like SIP, MGCP and H.323. As illustrated in FIG. 1, the endpoints 106a-c and their corresponding call managers 108a-c participating in a call need not be connected to the same switch 102. For example, endpoint 106a and endpoint 106c can participate in the same call even though both the endpoints 106a and 106c are not directly coupled to switch 102.

Network 140 is a network of interconnected computers and/or switches that facilitate the transmission of digital data between call manager 108c and the call application server 112. Examples of network 140 include internet, local area network and wide area network.

PSTN 130 is a public switched telephone network that facilitates call connections between endpoints 106a-c on various telephone networks.

Endpoint 106

FIG. 2 is a block diagram illustrating an endpoint 106 according to one embodiment of the invention. Endpoint 106 comprises an endpoint controller 202, third party authentication module 204, a call upgrade endpoint module 206, an endpoint user interface ("UI") module 210 and a call park endpoint module 212. These endpoint modules 202-212 are communicatively coupled to each other through communication bus 249 and the communication bus 249 is communicatively coupled to communication buses 154, 156, 160, 168, 170 and 182.

The endpoint controller 202 directs other modules 204-212 in endpoint 106a-b to implement their respective tasks at appropriate times. For example, the endpoint controller 202 directs the endpoint UI module 210 and receives user input from the endpoint UI module 210 at various times when the user provides input through the user interface 900a-f available on the endpoint 106. The functions of endpoint controller 202 are further described below with reference to FIGS. 5-8.

The third party authentication module 204 receives from a first user through the endpoint UI module 210 a request to authenticate a second user's endpoint 106 for the conference call. The request includes identification strings for the second user's endpoint and the first user's endpoint 106. In one embodiment, the identification string is an alphanumeric string like a telephone number associated with the endpoint. The third party authentication module 204 determines the required authentication data and transmits the authentication data to switch 102 through communication bus 154, 156. As discussed above, in other embodiments, such determination of authentication data and various other functions illustrated in endpoint 106 can also be implemented in switch 102. In one embodiment, the authentication data includes a password or an identification number associated with the call or a participant of the call. The third party authentication module 204 receives and stores the authentication data from endpoint UI module 210 after the first user inputs the authentication data to access the call. In one embodiment, the authentication data is stored at the switch 102 and not at endpoint 106. In this embodiment, the third party authentication module 204 transmits the request for authenticating the second user's endpoint 106 to switch 102 with the identification strings for first and second users' endpoints 106.

The call upgrade endpoint module 206 receives from user through the endpoint UI module 210 a request to upgrade a call to a collaborated session that includes a visual presentation in addition to the voice call. The call upgrade endpoint module 206 transmits the received request to switch 102 on communication bus 154, 156. After the visual presentation for the collaborated session is created, the switch 102 transmits an access granted signal to call upgrade endpoint module 206. In one embodiment, in response to receiving the access granted signal, the call upgrade module 206 directs the endpoint UI module 210 to indicate that the visual presentation is now available on call manager 108.

The call park endpoint module 212 receives from the user through the endpoint UI module 210 a request to park or unpark a call. Call parking is a feature that allows the user to put a call on hold or on park at one endpoint 106a and continue or unpark the call from another endpoint 106b. The call park endpoint module 212 receives the park or unpark request through endpoint UI module 210 and transmits the received request to switch 102 on communication bus 154, 156.

Switch 102

Figure 3:
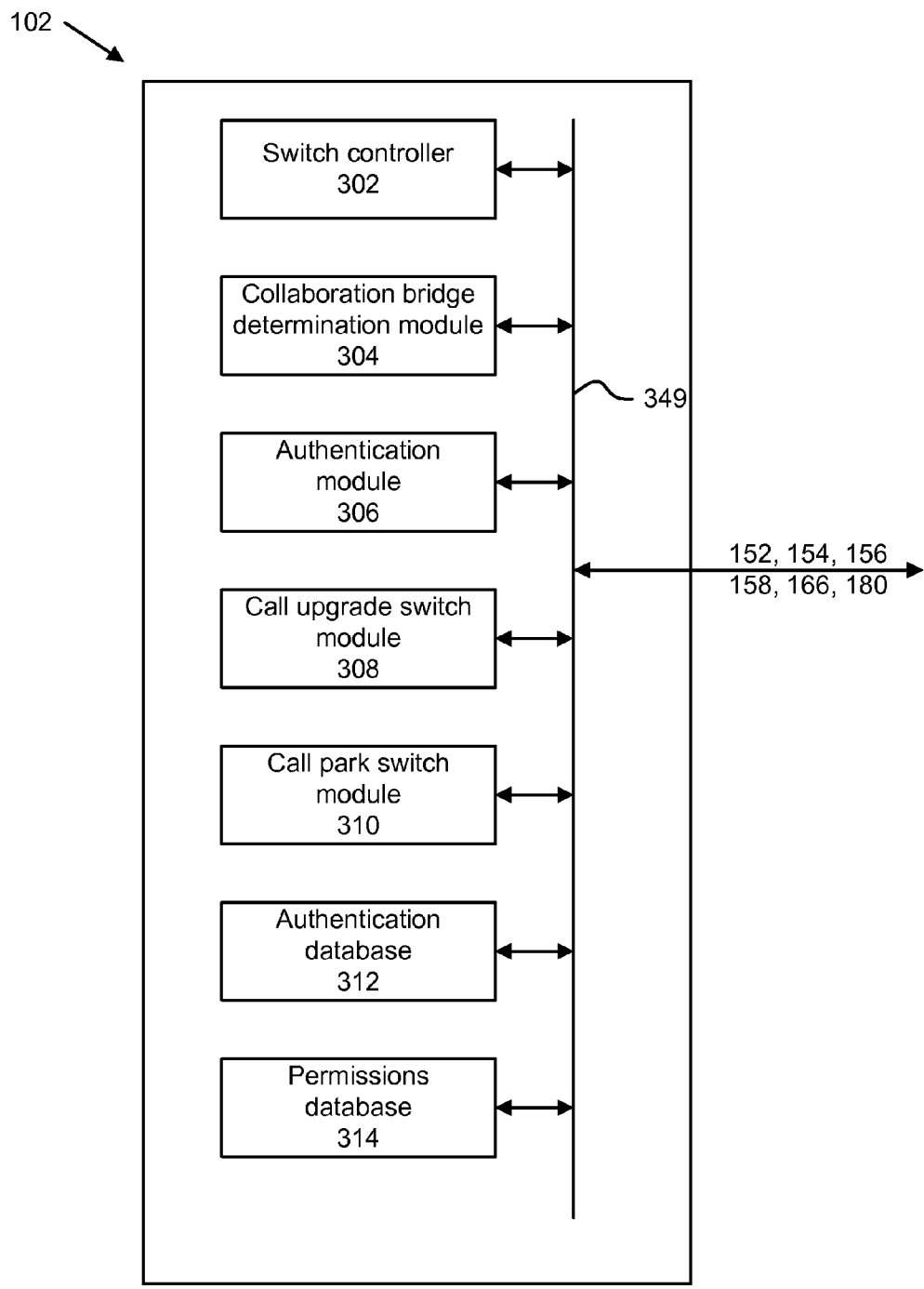
FIG. 3 is a block diagram illustrating a switch according to one embodiment of the invention.

FIG. 3 is a block diagram illustrating the switch 102 according to one embodiment of the invention. The switch 102 comprises a switch controller 302, a collaboration bridge determination module 304, an authentication module 306, a call upgrade switch module 308, a call park switch module 310, an authentication database 312 and a permissions database 314. The modules 302-314 are communicatively coupled to each other through communication bus 349 and the communication bus 349 is communicatively coupled to communication buses 152, 154, 156, 158, 166 and 180.

Switch controller 302 directs other modules in the switch 102 to implement their respective tasks at appropriate times. For example, responsive to receiving a collaboration call request, the switch controller 302 directs the collaboration bridge determination module 304 to determine the collaboration bridge 104 for that call. Similarly, the switch controller 302 directs the call upgrade switch module 308 to upgrade the call to a collaboration call responsive to receiving an upgrade request. The functionality of switch controller 302 is further described in FIGS. 5-8.

The collaboration bridge determination module 304 determines a collaboration bridge 104 for creating a visual representation for a requested collaborated session in response to a request from an endpoint 106. In one embodiment, the collaboration bridge determination module 304 retrieves a configuration file (not shown) that specifies the pre-determined collaboration bridge 104 corresponding to the requesting endpoint 106. In another embodiment, the collaboration bridge determination module 304 receives from various collaboration bridges 104 information about the amount of their available resources like available processing power, network bandwidth and memory. Based on the received information, the collaboration bridge determination module 304 selects the collaboration bridge 104 with most available resources for handling the received request for visual presentation.

The authentication module 306 determines authentication data for third party authentication requests and transmits the authentication data to the endpoint 106 that is being authenticated. In one embodiment, the authentication module 306 receives the authentication data with the third party authentication request and the authentication module 306 extracts the authentication data from the received request. In another embodiment, the authentication module 306 does not receive the authentication data with the third party authentication request. In this embodiment, the authentication module 306 retrieves the authentication data from authentication database 312.

The authentication database 312 stores authentication information associated with a conference call and/or conference call participants. In one embodiment, the authentication database 312 stores identification strings of invited and/or active call participants for a conference call. In one embodiment, the authentication database 312 stores a common password for all the participants associated with the call. In another embodiment, the authentication database 312 stores separate passwords associated with one or more call participants. The authentication database 312 receives the identification strings of invited call participants and associated one or more passwords when the call administrator sets up the conference call. In one embodiment, the authentication database does not include a list of invited participants for the conference call and the authentication database develops a list of active participants as the participants join the conference call. Additionally, in yet another embodiment, the authentication database 312 stores identification strings for call managers 108a-b associated with the invited or active endpoints 106a-b. The authentication database 312 receives this information when the call managers 108a-b are registered or associated with corresponding endpoints 106a-b or when the conference call administrator configures a conference call.

The call upgrade switch module 308 communicates with the call upgrade endpoint module 206 and the call upgrade bridge module 404 to upgrade a call to a collaboration call. The switch controller 302 receives through communication bus 154, 156 a call upgrade request from call upgrade endpoint module 206 and this request is forwarded to the call upgrade switch module 308. On receiving the upgrade request, the call upgrade switch module 308 transmits a request for an available collaboration bridge 104 to collaboration bridge determination module 304 and receives an identification string for an available collaboration bridge 104. The call upgrade switch module 308 then transmits to the determined collaboration bridge 104 a request for a visual presentation for the requested collaboration call. The call upgrade switch module 308 receives a link, like a Uniform Resource Locator (URL), for the visual presentation, transmits the received link to the switch controller 302 and the switch controller 302 transmits the link to the call managers 108a-c associated with endpoints 106a-b participating in the call. In one embodiment, the link to the visual presentation is received by the call application server 112 and the call application server 112 transmits the link to the call managers 108a-c associated with endpoints 106a-b participating in the call. In one embodiment, the call manager 108b is part of the participating endpoint 106b and the switch controller 302 transmits the received link to the endpoint 106b itself. In another embodiment, the call upgrade switch module 308 transmits through the switch controller 302 a collaboration request grant to the participating endpoints 106a-b. The request grant allows the participating endpoints 106a-b to inform the user through a visual or audible indicator that a visual presentation associated with the call is now available.

The call park switch module 310 receives a park and unpark request from endpoints 106a-b. On receiving an unpark request for an endpoint the call park switch module 310 retrieves the permissions from permissions database 314 associated with the endpoint 106a-b that transmitted the call park request. The call park switch module 310 then associates or transfers the retrieved permissions to the endpoint 106a-b that transmitted the unpark request for the call. Accordingly, the permissions associated with a requesting endpoint 106a-b travel with the call to the endpoint 106a-b where the call is unparked and continued.

The permissions database 314 stores permissions associated with an endpoint 106a-b participating in a call. The permissions database 314 includes an identification string for the participating endpoint 106a-b, an identification string for the call in which the endpoint 106a-b is participating and permissions associated with the participating endpoint 106a-b. The identification strings for the call and the endpoint 106a-b are alpha-numeric strings. Examples of permissions associated with an endpoint 106a-b include permission to mute a participating endpoint 106a-b, to alter the volume for a participating endpoint 106a-b, to disconnect a participating endpoint 106a-b from the call, to invite a participating endpoint 106a-b to the call and to authenticate a participating endpoint 106a-b for the call. The permissions database 314 is populated by a call administrator through a user interface (not shown) when the call is set up or at another point in time. In one embodiment, one or more permissions in the permissions database 314 are associated with the participating endpoint 106a-b based on the temporal order in which the participating endpoint 106a-b joined the call. For example, if the participating endpoint 106a-b is the originator of the call or the first participant to join the call, the permissions database 314 associates one or more permissions stated above with the participating endpoint 106a-b. In another embodiment, permissions are associated with a participating endpoint 106a-b based on the position of the user associated with the participating endpoint 106a-b. For example, the participating endpoint 106a-b is associated with different permissions based on whether its user is a manager or an entry level worker.

Collaboration Bridge 104

Figure 4:
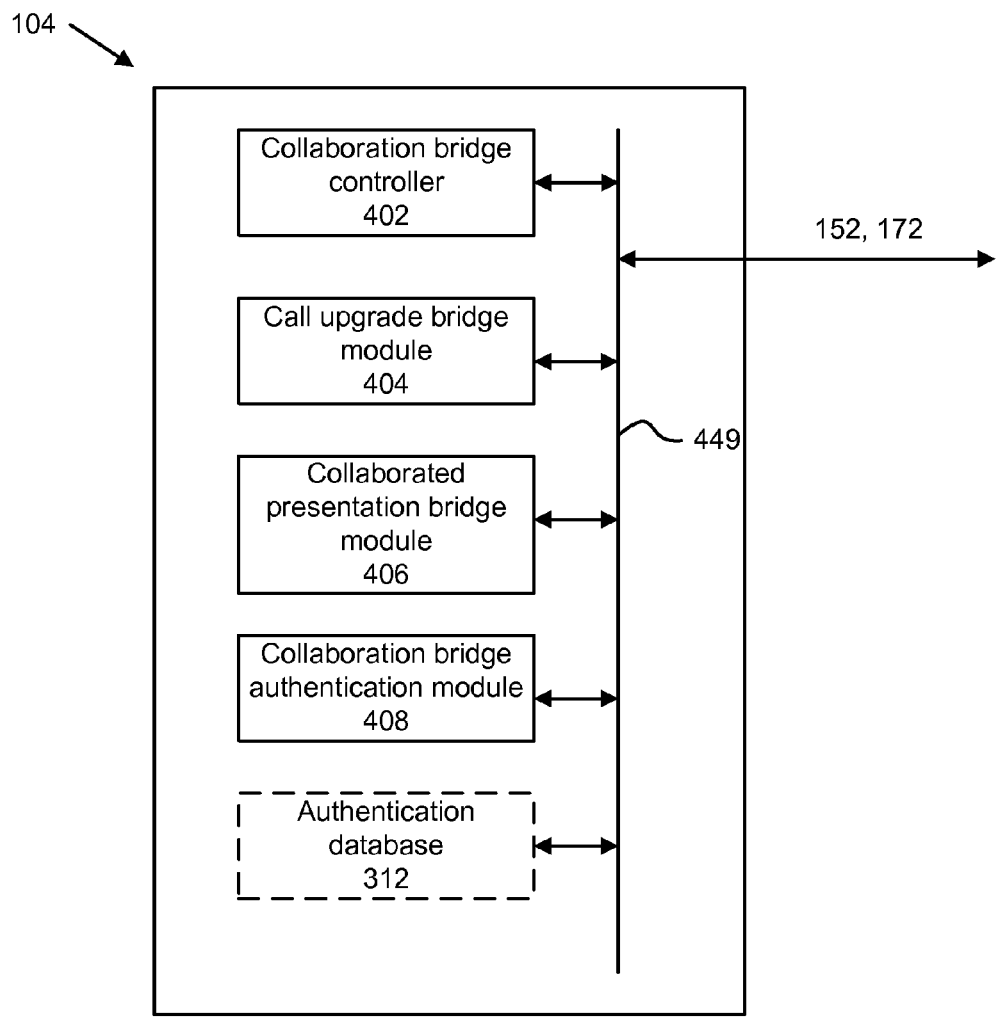
FIG. 4 is a block diagram illustrating a collaboration bridge according to one embodiment of the invention.

FIG. 4 is a block diagram illustrating a collaboration bridge 104 according to one embodiment of the invention. The collaboration bridge 104 comprises a collaboration bridge controller 402, a call upgrade bridge module 404, a collaborated presentation bridge module 406, a collaboration bridge authentication module 408, and optionally an authentication database 312. These modules 402-408 and 312 of the collaboration bridge 104 are communicatively coupled to each other through communication bus 449. The communication bus 449 is communicatively coupled to communication busses 152, 172.

The collaboration bridge controller 402 directs other modules in the collaboration bridge 104 to implement their respective tasks at appropriate times. For example, responsive to receiving a collaboration call request, the collaboration bridge controller 402 directs the collaboration bridge authentication module 408 to authenticate an endpoint 106 participating in the collaboration call. The functionality of collaboration bridge controller 402 is further described in FIGS. 5-6B.

The call upgrade bridge module 404 communicates with the call upgrade endpoint module 206 and call upgrade switch module 206 to upgrade a call to a collaboration call. The call upgrade bridge module 404 receives a request to upgrade a call to a collaboration call, and requests and receives a link to a visual presentation for the call from collaborated presentation bridge module 406. The call upgrade bridge module 404 then transmits the received link to call upgrade switch module 206 through communication bus 152. In one embodiment, the collaboration bridge 104 also determines the identification string of participating endpoints 106a-b and transmits the upgrade grant to the call participants in addition to transmitting the link to the switch 104. In this embodiment, the call upgrade bridge module 404 transmits a query to conference bridge 110 on communication bus 172 and receives the identification string of call participants from the conference bridge 110.

The collaborated presentation bridge module 406 creates a visual presentation for a collaboration call. In one embodiment, the collaborated presentation bridge module 406 creates the visual presentation in a web page using a markup language like HyperText Markup Language (HTML), a scripting language like JavaScript, a style sheet language like Cascading Style Sheets (CSS) and/or Flash Video. A link for the visual presentation is then transmitted to call upgrade switch module 308. The call upgrade switch module 308 communicates the link to the call managers 108a-b associated with the endpoints 106a-b participating in the collaboration call. The call participants access the visual presentation on the call managers 108a-b through the link and interact with each other through the visual presentation. For example, a participant points to a particular object in the presentation using a mouse attached to one of the call managers 108a-b and the other participants see the mouse pointer pointing to the object on their screens displaying the visual presentation. A script in the visual presentation or a module (not shown) in the client displaying the visual presentation tracks the call participant's activity (like pointing to a presentation object with a mouse) and transmits signals indicating the activity to collaborated presentation bridge module 406. The collaborated presentation bridge module 406 updates the visual presentation to indicate various participants' activity on the visual presentation. Consequently, the call participants see on their call managers 108a-b the updated visual presentation with other call participants' interaction with the visual presentation.

The collaboration bridge authentication module 408 authenticates participating endpoints 106a-b for a collaboration call. The collaboration bridge authentication module 408 requests and receives the authentication data from the participating endpoints, verifies the authentication data against the authentication data in authentication database 312 and authenticates the participating endpoints 106a-b based on the received authentication data.

The authentication database 312 has been described above. In one embodiment, the switch 102 and collaboration bridge 104 are a combined entity and the modules in switch 102 and collaboration bridge 104 share the same authentication database 312 module. In another embodiment, the switch 102 and the collaboration bridge 104 are separate entities as illustrated and both entities have their separate copies of authentication database 312. In yet another embodiment, the authentication database 312 resides in either the switch 102, the collaboration bridge 104 or as a separate entity, and the modules in switch 102 and collaboration bridge 104 access the authentication database 312 through a communication bus.

Context Sensitive User Interface

Figure 9A:
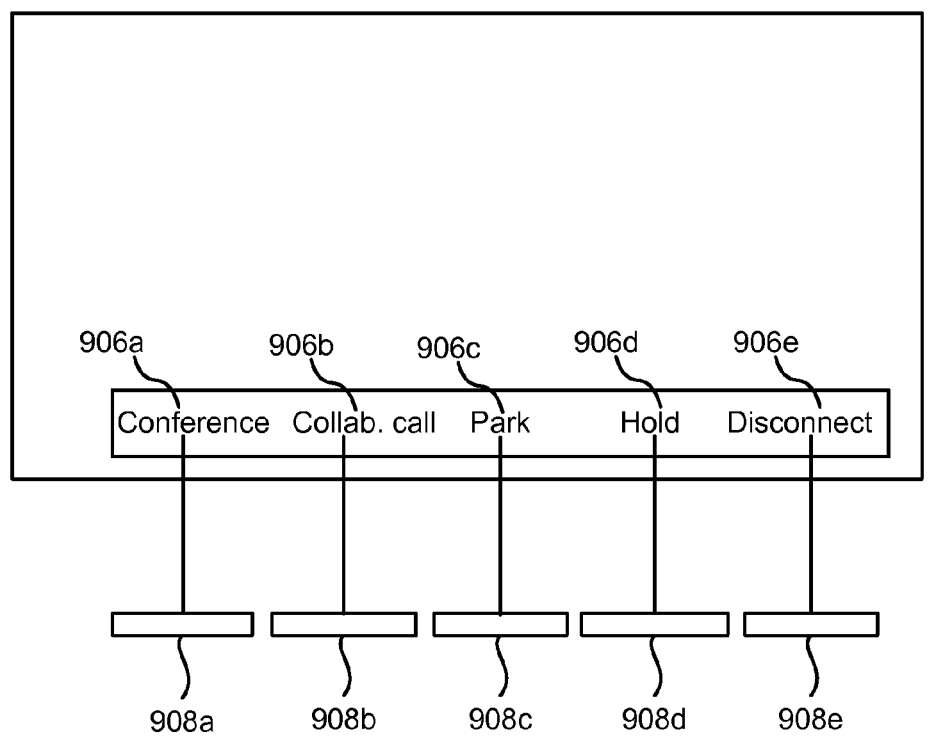
FIGS. 9A-F are block diagrams illustrating the user interface for accessing various call features from an endpoint according to one embodiment of the invention.
Figure 9B:
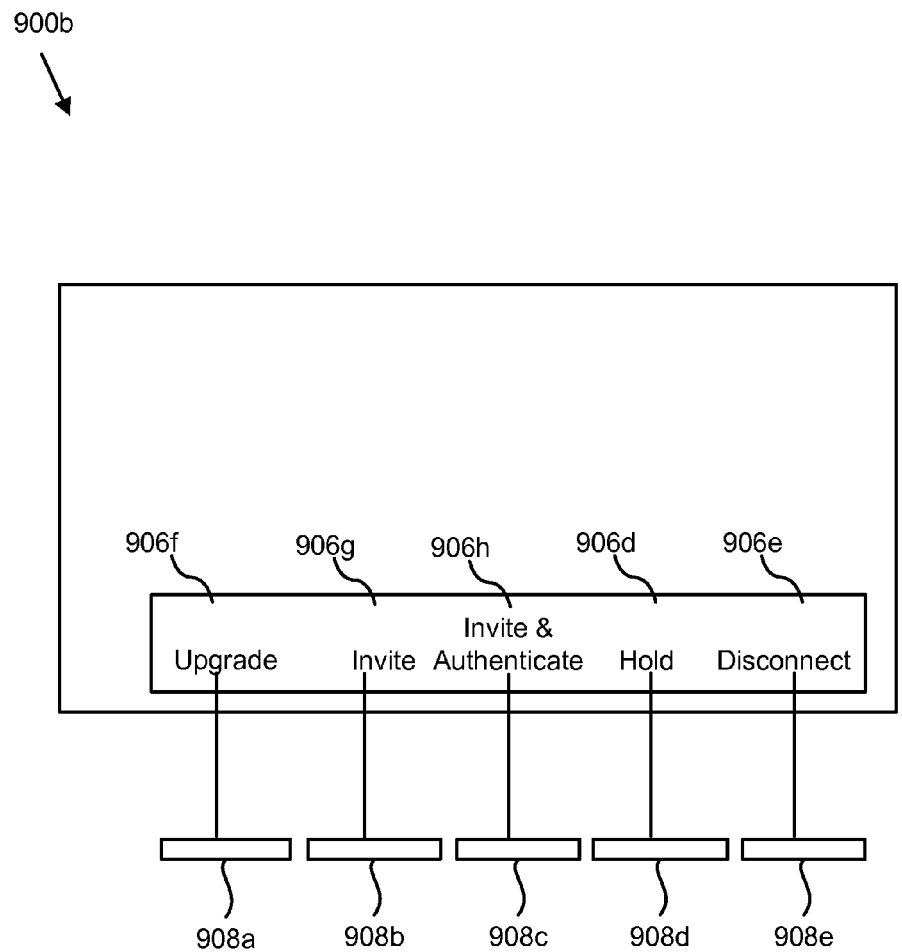
Figure 9C:
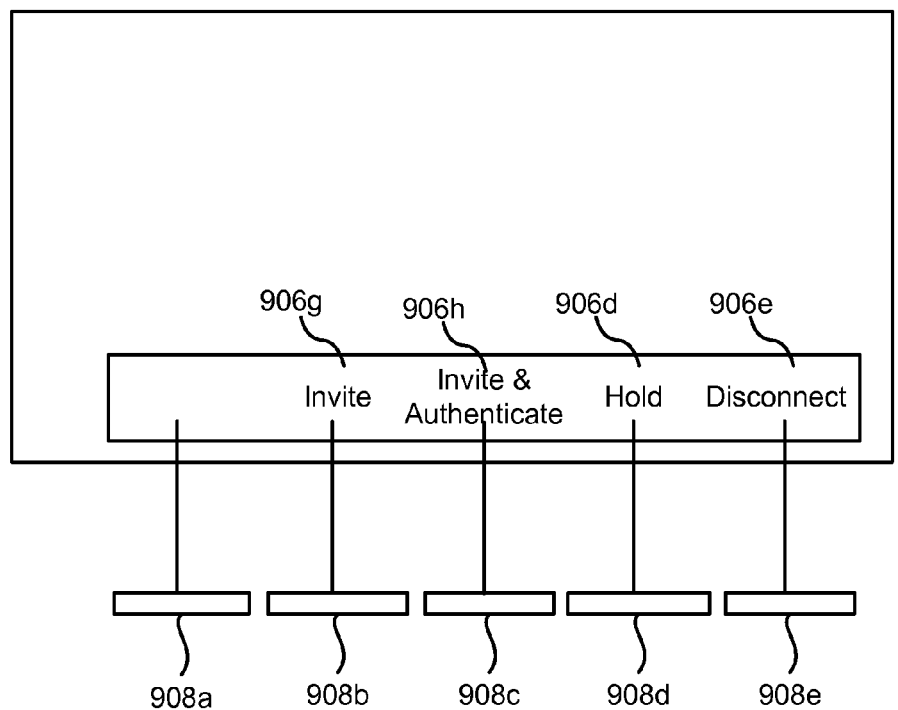

One of the many advantages of the system and methods described in this specification is the context sensitive user interface that provides value to the user through its simplicity. For example, the user interface illustrated in FIGS. 9D-F provides a familiar and intuitive interface to the user for calling another user, bringing another user into a conference call, initiating a collaboration session, bringing another user into a collaboration session and adding collaboration session to a call in progress.

Figure 9D:
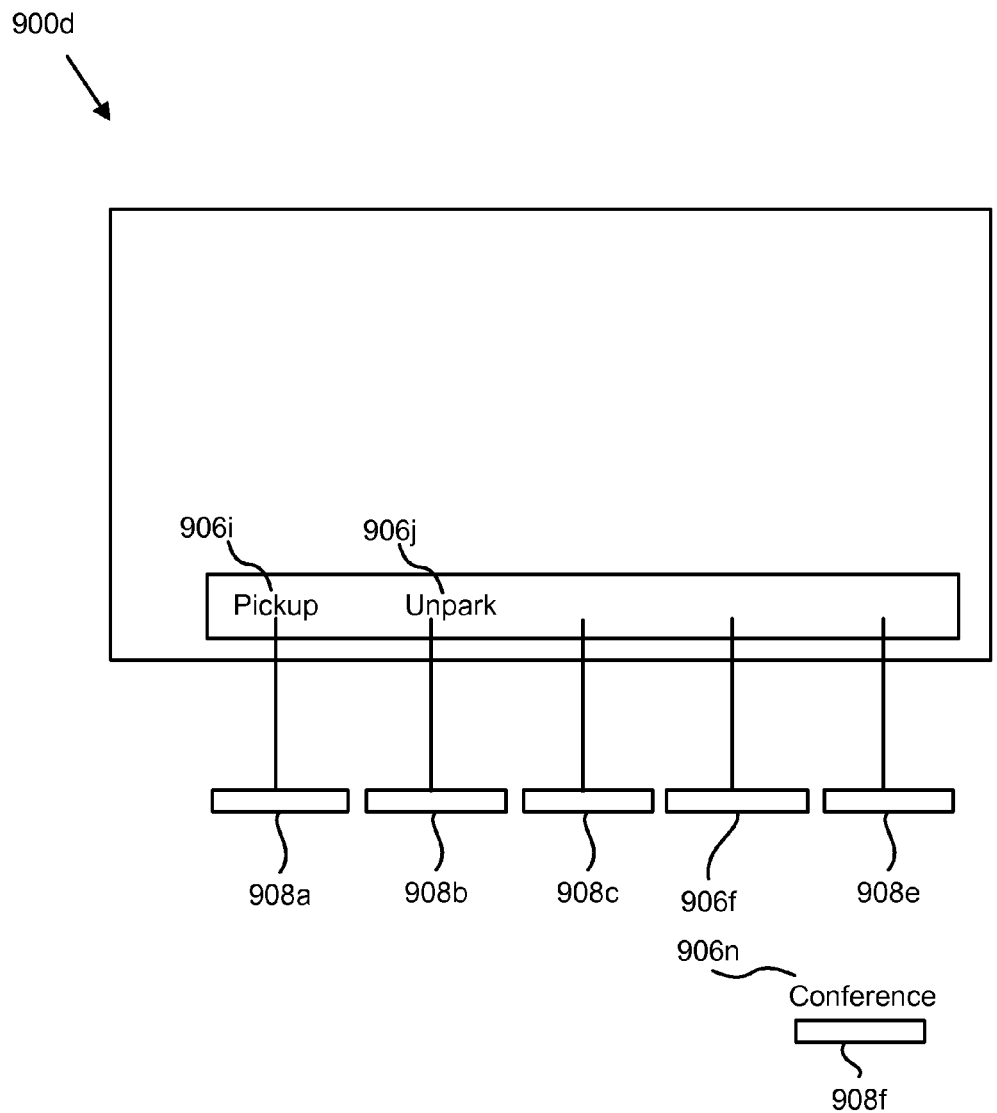
Figure 9E:
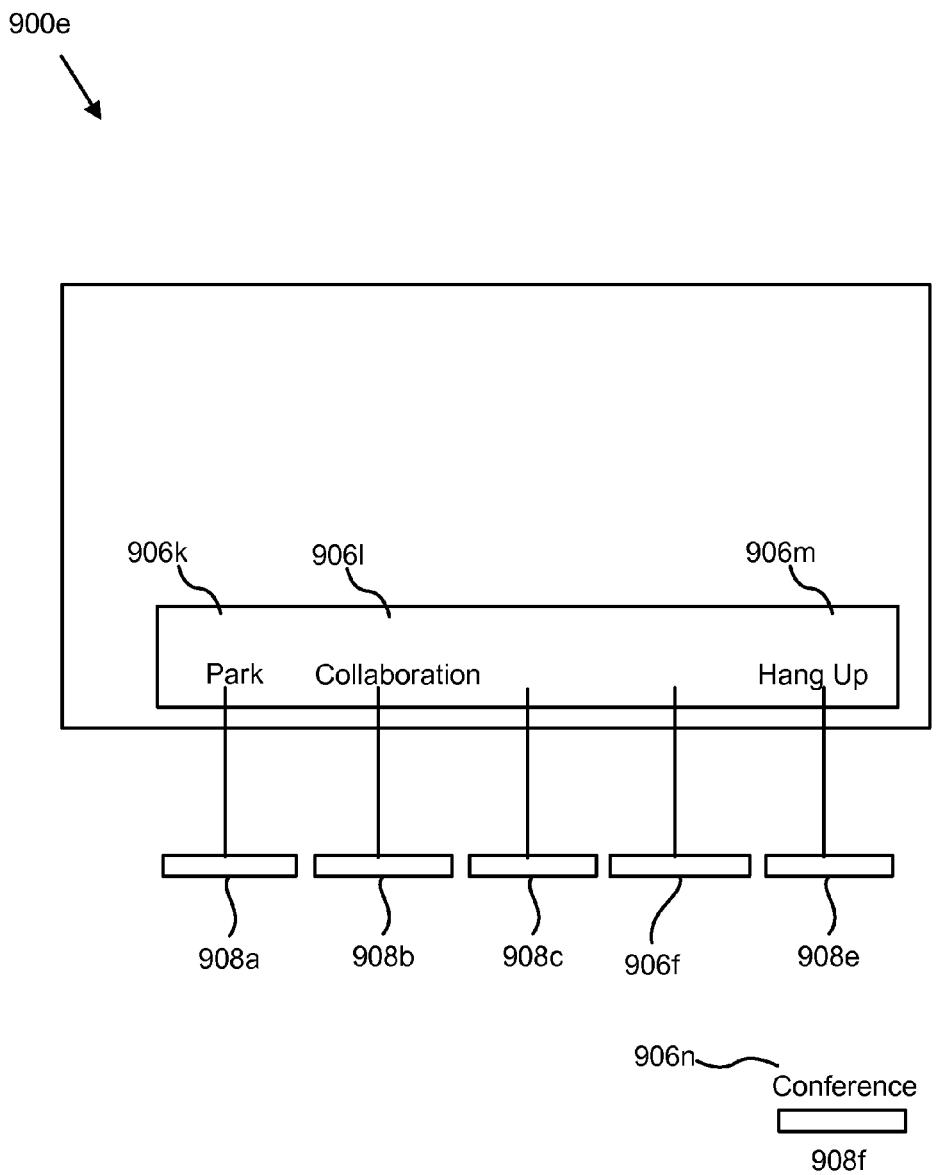
Figure 9F:
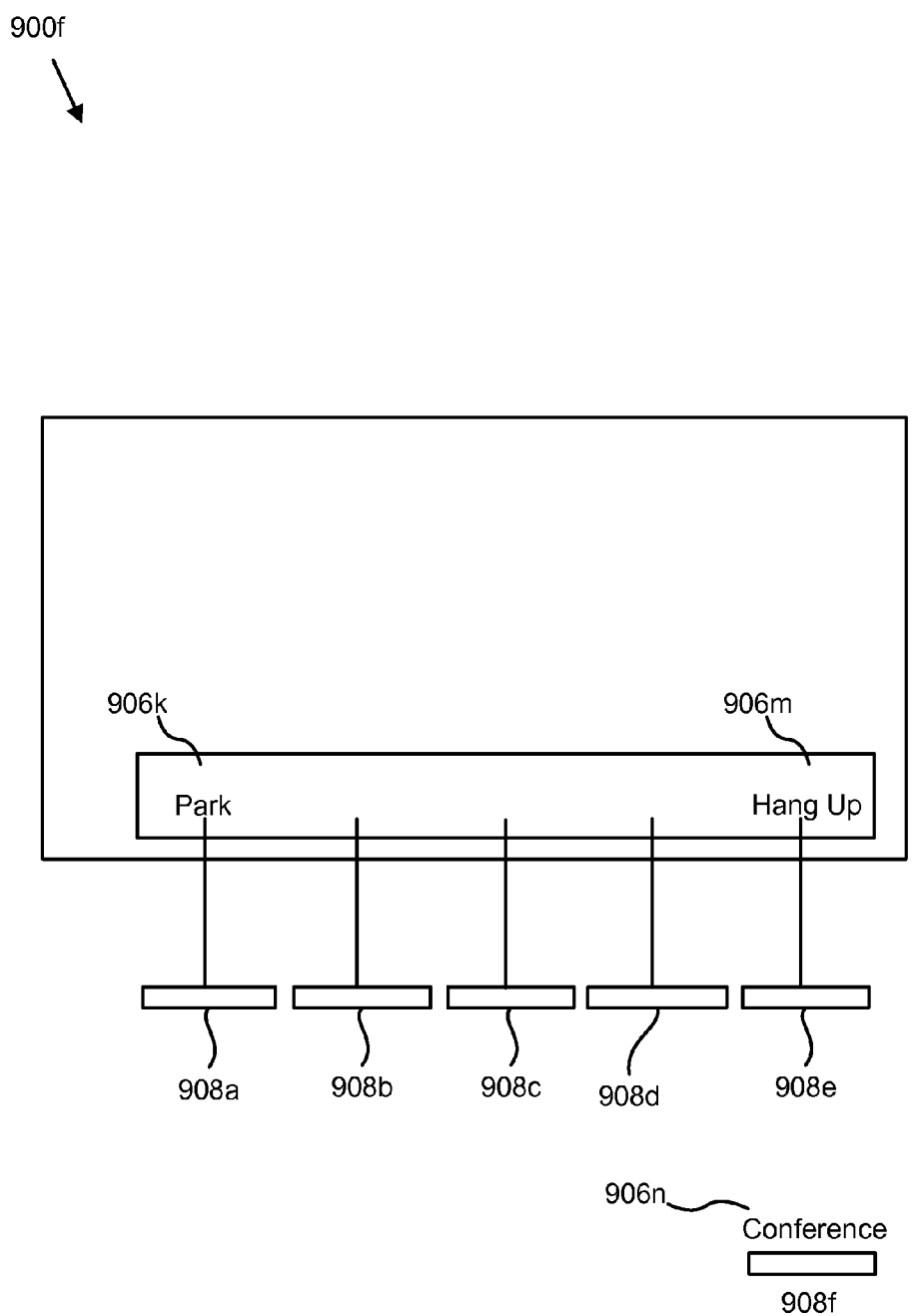

The interface 900d illustrated in FIG. 9D includes a pickup option 906i and a corresponding key 908a, an unpark option 906j and a corresponding key 908b, a conference option 906n and a corresponding key 908f. In one embodiment, the conference option 906n and the corresponding key 908f is a versatile pair that provides a user with a number of options. If a call is not already in progress, the switch 102 receives the key 908f selection from endpoint 106a-c and the switch 102 interprets the selection of key 908f as a request to reach the conference bridge 110 when the system 100 includes a conference bridge 110. On the other hand, if a call is already in progress, the switch 102 receives the key 908f selection from endpoint 106a-c and the switch 102 assumes that the users want to conference in another party. Accordingly, the switch 102 interprets the selection of key 908f as a request to conference in another caller. In this manner, key 908f can provide versatile functionality that adapts to whether or not the endpoint 106a-c is participating in a call.

In one embodiment, to call another user, the user of endpoint 106a picks up the phone and dials the other user's number. After the other user answers the call, the context sensitive user interface 900e illustrated in FIG. 9E is displayed on the users' endpoints 106a-b. Accordingly, after the call between the two users is established, the user interface 900e on the endpoints 106a-b include a park option 906k and a corresponding key 908a, a collaboration option 906l and a corresponding key 908b, a hang up option 906m and a corresponding key 908e, and a conference option 906n and a corresponding key 908f.

To include another user into the call, the user of endpoint 106a selects key 908f corresponding to the conference option 906n and dials the number for the additional user. After receiving the additional user's number, the user interface at the endpoint 106a optionally prompts (not shown) the user confirming if the user wants to complete the conference call. The endpoint 106a then displays the "yes" and "cancel" options (not shown) to the user. The user can now conference the additional user into the call by selecting the "yes" option. In this manner, the user interfaces 900d-e illustrated in FIGS. 9D-E provide a context sensitive user interface that adapts to the status of the user's call and provides the user with intuitive interface to access currently available features for the call.

The user interface 900e illustrated in FIG. 9E can also be used to add another user to an in-progress call and start a collaboration session. The user of endpoint 106a selects the 908f key corresponding to the conference feature 906n and the user is prompted to enter an access code. The endpoint 106a then receives the access code from the user and optionally prompts (not shown) the user confirming if the user wants to add the user to the collaboration session. The endpoint 106a then displays the "yes" and "cancel" options (not shown) to the user. The user can now add the additional user into the conference call by selecting the "yes" option. Consequently, the user of endpoint 106a can select key 908b corresponding to the collaboration feature 906l and the call managers 108a-b associated with endpoints 106a-b of all the users in the call display the collaboration session.

Returning back to the example with two users connected on a call, a user can start a collaboration session between the two users by selecting key 908b corresponding to the collaboration feature 906l as illustrated in FIG. 9E. In one embodiment, the user dials into a particular collaboration bridge 104 for the collaboration session. In this embodiment, the user dials the number for the collaboration bridge 104 after selecting key 908b corresponding to the collaboration feature 906l. Consequently, the collaboration session is started on call managers 108a-b corresponding to the users' endpoints 106a-b and the endpoints 106a-b display the user interface 900f illustrated in FIG. 9F. The user interface 900f illustrated in FIG. 9F includes the Park feature 906k and the corresponding key 908a, hang up feature 906m and the corresponding key 908e, and the conference feature 906n and the corresponding key 908f.

To add another user into an in-progress collaboration session, the user of endpoint 106a selects key 908f corresponding to the conference feature 906n illustrated in FIG. 9F. The user then dials the additional user's number and the endpoint optionally prompts (not shown) the user to confirm whether to conference in the additional user. The endpoint 106a then displays the "yes" and "cancel" options (not shown) to the user. The user can now add the additional user into the call by selecting the "yes" option. Consequently, the additional user is connected to the call and the collaboration session is displayed on the call manager 108 associated with the endpoint 106 of the additional user.

In this manner, the user interface 900d-f on endpoint 106 provides the user with context sensitive options to access various features. Upon reading this disclosure, one of ordinary skill in the art will understand that various other embodiments of user interface can be used to access the disclosed features. For example, a user interface that does not change with the status of a call or changes in a different manner can also be used to access the disclosed features.

Seamless Authentication Methodology

Figure 5A:
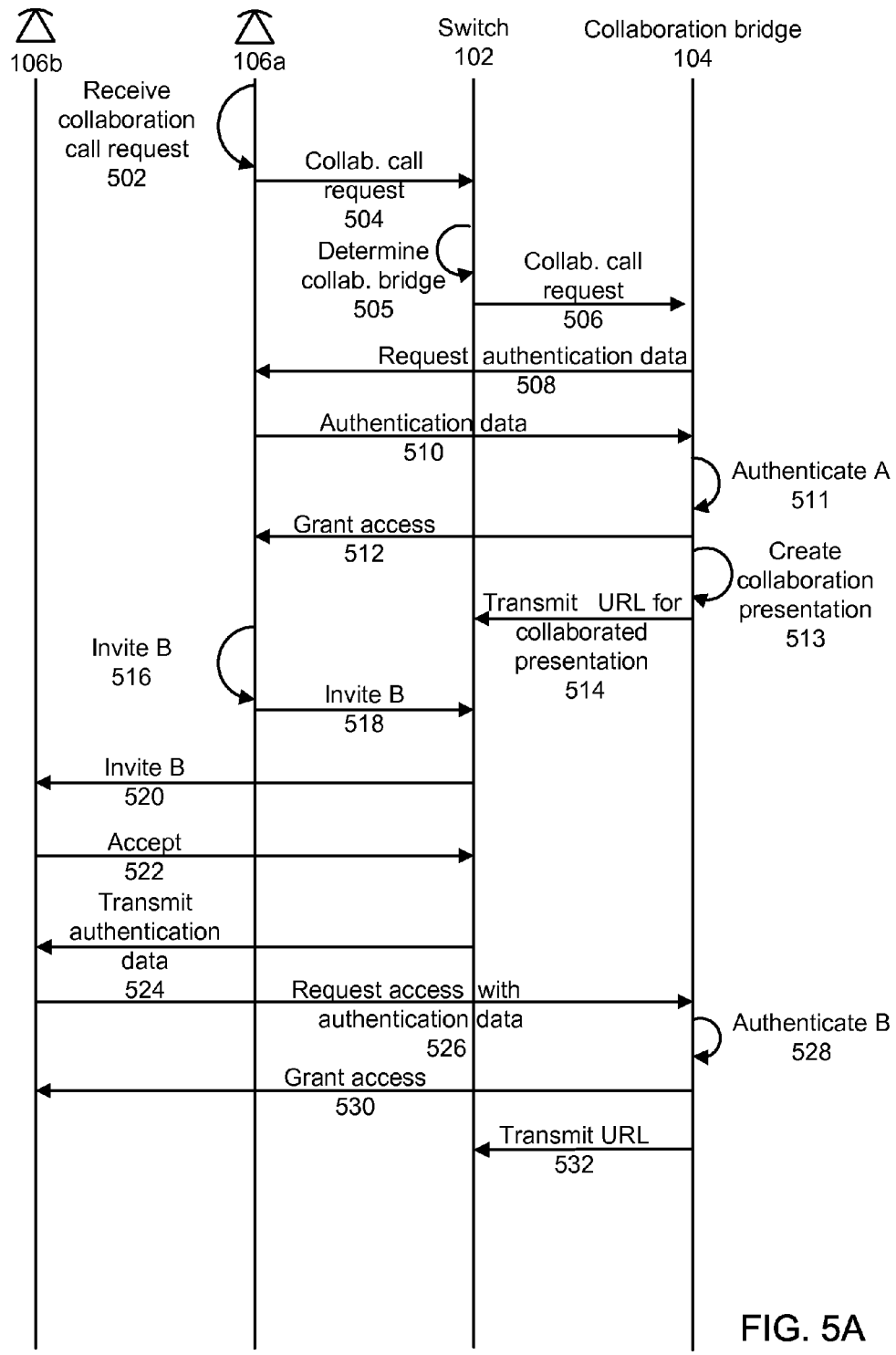
FIG. 5A is a trace diagram illustrating a first method for seamless authentication according to one embodiment of the invention.

FIG. 5A is a trace diagram illustrating a method for seamless authentication according to one embodiment of the invention. One of ordinary skill in the art will understand that although FIG. 5A illustrates seamless authentication for a collaboration call, the technique disclosed in FIG. 5A and other parts of the specification can also be used to seamlessly authenticate participants for a conference call or any other call that requires authentication.

The method begins with a user selecting a collaboration call feature through an interface on endpoint 106a. FIG. 9A illustrates an example of such a user interface 900a. The example interface 900a displays various features available for the call and includes corresponding keys for selecting the feature. The interface 900a includes a conference call option 906a that can be selected by pressing a corresponding key 908a, a collaboration call option 906b that can be selected by pressing a corresponding key 908b, a park option 906c that can be selected by pressing a corresponding key 908c, a hold option 906d that can be selected by pressing a corresponding key 908d and a disconnect option 906e that can be selected by pressing a corresponding key 908e.

The user selects key 908b and the endpoint controller 202 through endpoint UI module 210 receives 502 the collaboration call request. In one embodiment, the endpoint controller 202 also receives a telephone number for the collaboration call. In another embodiment, the endpoint UI module 210 is preconfigured with a collaboration call number and the endpoint controller 202 uses the pre-configured number for the collaboration call. Accordingly, the user does not enter a number for a collaboration call and the user only selects key 908a to initiate a collaboration call. In yet another embodiment, the switch 102 is pre-configured with the collaboration call number and the endpoint controller 202 need not provide a pre-configured collaboration call number. The endpoint controller 202 transmits 504 the received request for collaboration call to switch 102. In one embodiment, the endpoint controller 202 also transmits with the request an identification string, like an IP address, associated with the endpoint 106a that includes the endpoint controller 202. In another embodiment, the endpoint controller 202 receives from the endpoint UI module 210 and transmits with the request an identification string associated with a user of the endpoint 106a. The switch controller 302 in switch 102 receives the collaboration call request and directs the collaboration bridge determination module 304 to determine a collaboration bridge 104 for the call. The collaboration bridge determination module 304 determines 505 the collaboration bridge 104 for the call and transmits an identification string for the determined collaboration bridge 104 to switch controller 302. The switch controller 302 then transmits 506 the collaboration call request to collaboration bridge 104. In one embodiment, the switch controller 302 also transmits the identification string for endpoint 106a or for the user of endpoint 106a with the collaboration call request to collaboration bridge 104.

The collaboration bridge controller 402 in collaboration bridge 104 receives the collaboration call request and transmits a request to the collaboration bridge authentication module 408 to authentication endpoint 106a. The collaboration bridge authentication module 408 identifies the requesting endpoint 106*a* by the received identifier and transmits 508 a request for authentication data to endpoint 106*a*. In one embodiment, the transmissions between the collaboration bridge 104 and the endpoints 106*a-b* are transmitted through switch 102. In such an embodiment, the collaboration bridge 104 requests switch 102 for authentication data for the collaboration call and switch 102 retrieves the authentication data from the requesting endpoint 106*a*. In another embodiment, the collaboration bridge 104 is communicatively coupled to endpoint 106*a* and the collaboration bridge 104 transmits the request for authentication data directly to endpoint 106*a*.

The endpoint controller 202 in endpoint 106 receives the request and directs the endpoint UI module 206 to request the user for authentication data. Again, the functionality of the endpoint controller 202 imputes intelligence to endpoints 106*a-c*. This description is for illustration purposes and in some embodiments, such functionality is implemented at switch 102 or another entity in system 100. Referring to FIG. 2, in one embodiment, the endpoint UI module 206 renders an audio and/or visual message for the user requesting authentication data. The endpoint UI module 206 then receives the authentication data from the user and transmits 510 the authentication data to collaboration bridge 104. In one embodiment, the endpoint 106*a* is pre-configured with authentication data associated with a user and the endpoint 106*a* transmits the pre-configured authentication data to collaboration bridge 104 without prompting the user to enter the authentication data.

The collaboration bridge controller 402 receives the authentication data and the collaboration bridge authentication module 408 authenticates 511 endpoint 106*a*. After authentication, the collaboration bridge controller 402 transmits 512 a grant to endpoint 106*a*. The collaboration bridge controller 402 also directs the collaborated presentation bridge module 406 to create a visual presentation for the call. The collaborated presentation module 406 creates 513 a visual presentation and transmits a link for the visual presentation to collaboration bridge controller 402. The collaboration bridge controller 402 transmits 514 the link to switch 102 and switch controller 302 determines the call manager 108*a* associated with requesting endpoint 106*a*. The switch controller 302 then transmits the received link to the determined call manager 108*a*.

After endpoint 106*a* is connected to a collaboration call, the endpoint UI module 210 in endpoint 106*a* displays an interface 900*c* on endpoint 106*a* like the interface 900*c* illustrated in FIG. 9C. In one embodiment, the displayed interface on endpoint 106*a* is the same interface as the interface 900*b* illustrated in FIG. 9B with the upgrade option 906*f* disabled and invisible. The interface 900*c* illustrated in FIG. 9C illustrates such an interface 900*c*. The interface 900*c* in FIG. 9C includes an invite option 906*g* that can be selected by pressing key 908*b*, an invite and authenticate option 906*h* that can be selected by pressing key 908*c*, a hold option 906*d* that can be selected by pressing key 908*d* and a disconnect option 906*e* that can be selected by pressing key 908*d*. In this embodiment, no function is assigned to key 908*a*. The user presses key 908*c* and the endpoint UI module 210 receives 516 the invite and authenticate request from the user. The user then enters a telephone number for endpoint 106*b* of the invited user and endpoint UI module 210 transmits 518 the received request with the telephone number to switch 102. In one embodiment, the user enters an identification for another user associated with endpoint 106*b*. The endpoint 106*a* determines a telephone number associated with the other user and transmits 518 the received invite & authenticate request with the determined telephone number to switch 102.

The switch controller 302 receives the request and telephone number and transmits 520 an invite to endpoint 106*b*. The user of endpoint 106*b* accepts the request by picking up the telephone or selecting an accept option (not shown) on the user interface of endpoint 106*b*. The endpoint controller 202 in endpoint 106*b* receives the accept signal from endpoint UI module 210 and the endpoint controller 202 transmits 522 the accept signal to switch 102.

Next, the switch controller 302 in switch 102 receives the accept signal and requests authentication data from the authentication module 306. In one embodiment, the request also includes an identification string associated with the endpoint 106*a* or the user of endpoint 106*a*. The authentication module 306 transmits the authentication data for endpoint 106*b* to switch controller 302 and the switch controller 302 transmits 524 the authentication data to endpoint 106*b*. In one embodiment, the switch controller 302 also transmits with the authentication data an identification string for the collaboration bridge 104 that is hosting the collaboration call. The endpoint controller 202 in endpoint 106*b* receives the authentication data and transmits 526 a request to the collaboration bridge 104 with the received authentication data. In one embodiment, the endpoint 106*b* is pre-configured with an identification string for the collaboration bridge 104 and the endpoint 106 transmits 526 the request to the pre-configured collaboration bridge 104. In another embodiment, the endpoint 106*b* transmits 526 the request to switch 102 and the switch 102 transmits the request to the appropriate collaboration bridge 104. In yet another embodiment, steps 524-526 are skipped. Instead, the switch controller 302 transmits the authentication data to the collaboration bridge 104 on behalf of endpoint 106*b*.

The collaboration bridge controller 402 in collaboration bridge 104 receives the request with authentication data, the collaboration bridge authentication module 408 authenticates 528 endpoint 106*b* and the collaboration bridge controller 402 transmits 530 a grant to endpoint 106*b*. In one embodiment, the collaboration bridge controller 402 does not transmit a grant to endpoint 106*b* and the method proceeds to step 532. The collaboration bridge controller 402 then transmits 532 the URL for the visual presentation created in step 513 to switch 102 and switch 102 transmits (not shown) the received URL to call manager 108*b* associated with endpoint 106*b*. In another embodiment, the switch 102 transmits (not shown) the received URL to a trunk and the trunk transmits the received URL to call manager 108*b* associated with endpoint 106*b*.

In this manner, the disclosed system 100 beneficially authenticates endpoint 106 for the call without requiring the manual input of authentication information from the user of endpoint 106*b*. Accordingly, the user of endpoint 106*b* need not memorize a password or an authentication code for the call.

Figure 5B:
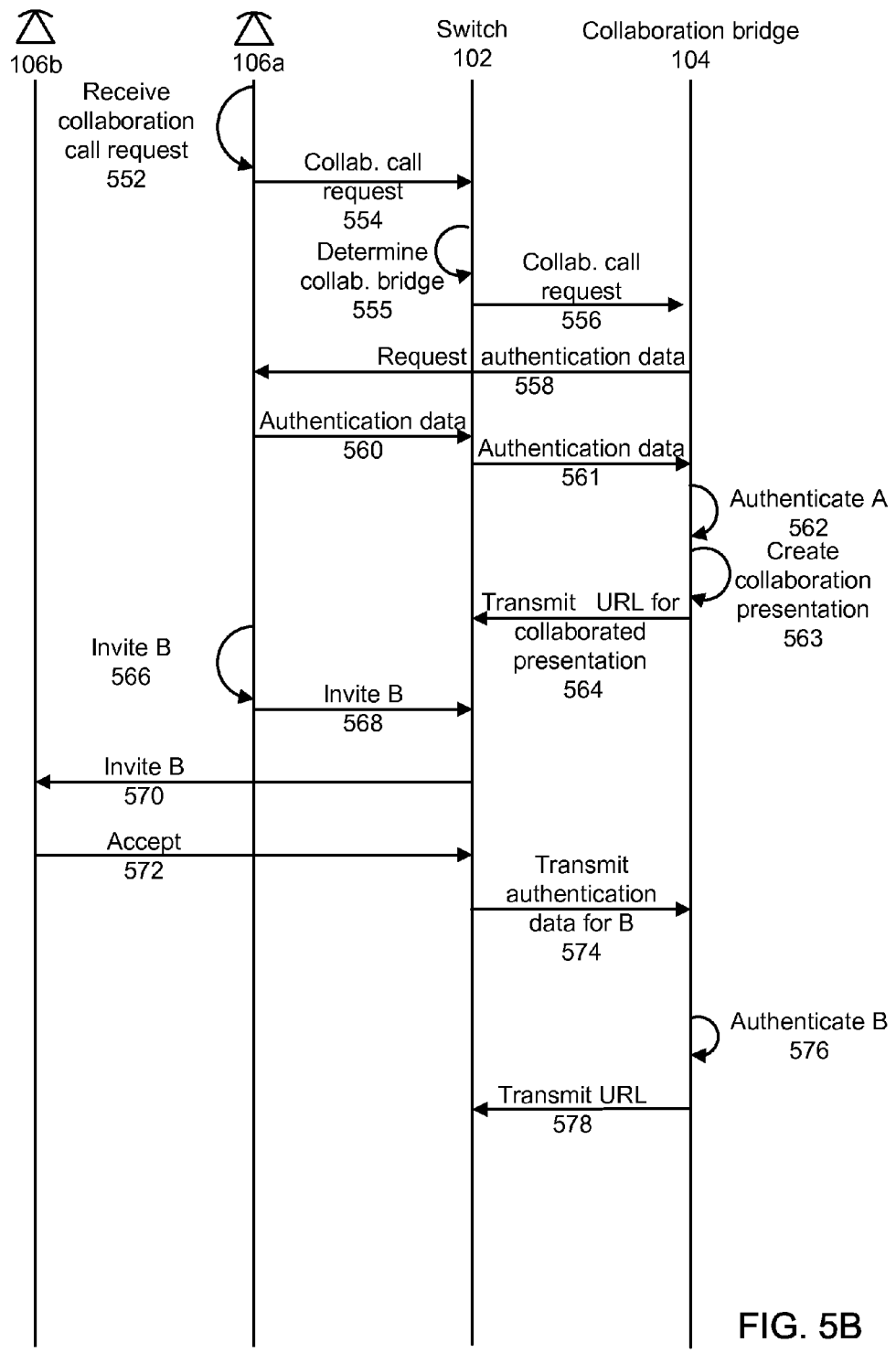
FIG. 5B is a trace diagram illustrating a second method for seamless authentication according to one embodiment of the invention.

FIG. 5B is a trace diagram illustrating a second method for seamless authentication according to one embodiment of the invention. In this embodiment, unlike step 524 in FIG. 5A, the authentication data for the second caller is not transmitted to the collaboration bridge 104 by the second endpoint 106*b*. Instead, the switch 102 stores the authentication data received from the first endpoint 106*a* and transmits to the collaboration bridge 104 the stored authentication data for authenticating the second endpoint 106*b*.

The method begins with endpoint 106*a* receiving 552 a request for a collaboration call. Steps 552-558 are similar to steps 502-508 described above in regards to FIG. 5A. At step 560, in response to receiving a request for authentication data, the endpoint UI module 206 in endpoint 106a prompts the user for authentication data, receives the authentication data and transmits 560 the authentication data to switch controller 302 in switch 102. The switch controller 302 saves the received authentication data and transmits 561 the authentication data to collaboration bridge controller 402 in collaboration bridge 104.

The collaboration bridge controller 402 receives the authentication data and the collaboration bridge authentication module 408 authenticates 562 endpoint 106a. Next, the collaboration bridge controller 402 also directs the collaborated presentation bridge module 406 to create a visual presentation for the call. The collaborated presentation module 406 creates 563 a visual presentation and transmits a link for the visual presentation to collaboration bridge controller 402. The collaboration bridge controller 402 transmits 564 the link to switch 102 and switch controller 302 determines the call manager 108a associated with requesting endpoint 106a. As illustrated, in this embodiment, the collaboration bridge controller 402 does not transmit a grant to endpoint 106a. Accordingly, FIGS. 5A and 5B illustrate that transmission of such grant signals is optional in collaboration call setup.

The switch controller 302 next transmits (not shown) the received link for the visual presentation to the determined call manager 108a. In one embodiment, the link is transmitted to call application server 112 and the call application server 112 transmits the link to call manager 108a.

After endpoint 106a is connected to a collaboration call, the endpoint UI module 210 in endpoint 106a displays an interface 900c on endpoint 106a like the interface 900c illustrated in FIG. 9C. The user presses key 908c in FIG. 9C and the endpoint UI module 210 receives 566 the invite and authenticate request from the user. The user then enters a telephone number for endpoint 106b of the invited user and endpoint UI module 210 transmits 568 the received request with the telephone number to switch 102. In one embodiment, the request includes an identification of the call initiated by endpoint 106a at step 552.

The switch controller 302 receives the request and transmits 570 an invite to endpoint 106b. The user of endpoint 106b accepts the request by picking up the telephone or selecting an accept option (not shown) on the user interface of endpoint 106b. The endpoint controller 202 in endpoint 106b receives the accept signal from endpoint UI module 210 and the endpoint controller 202 transmits 572 the accept signal to switch 102.

Next, the switch controller 302 in switch 102 receives the accept signal and the authentication module 306 determines the authentication data for endpoint 106b. The authentication module 306 retrieves the previously stored authentication data associated with endpoint 106a. In one embodiment, switch controller 302 associates the previously stored authentication data with an identification of the call initiated at step 552. Later, the authentication module 306 receives the identification with the request for authentication data and the authentication module 306 retrieves the authentication data associated with the call identification. Regardless of how the authentication module 306 retrieves the authentication data, the authentication module 306 transmits 574 the retrieved authentication data to collaboration bridge 104 as authentication data for endpoint 106b. Accordingly, the endpoint 106b need not store or receive the authentication data for the call as the switch 102 stores and transmits the authentication data for endpoint 106b.

The collaboration bridge controller 402 in collaboration bridge 104 receives the authentication data, the collaboration bridge authentication module 408 authenticates 576 endpoint 106b and the collaboration bridge controller 402 transmits 578 the URL for the visual presentation created in step 563 to switch 102. The switch 102 then transmits (not shown) the received URL to call manager 108b associated with endpoint 106b.

In this manner, the disclosed system 100 beneficially authenticates endpoint 106b for the call without requiring the endpoint 106b to store or request authentication data for the call.

In one embodiment, additional endpoints 106 may join an already existing call by providing their own authentication information. For example, a collaboration call may already be in progress. Additional endpoints 106 may join the collaboration call by calling a telephone number and providing any other information needed, such as an access code to be authenticated for joining the call. Once the additional endpoint 106 is authenticated, the collaboration bridge 104 transmits the URL to the switch 102 which then transmits it to the call manager 108 associated with the additional endpoint 106. This eliminates the need for the caller using the additional endpoint 106 to get the URL for the visual presentation in another manner.

Call Upgrade Methodology

Figure 6A:
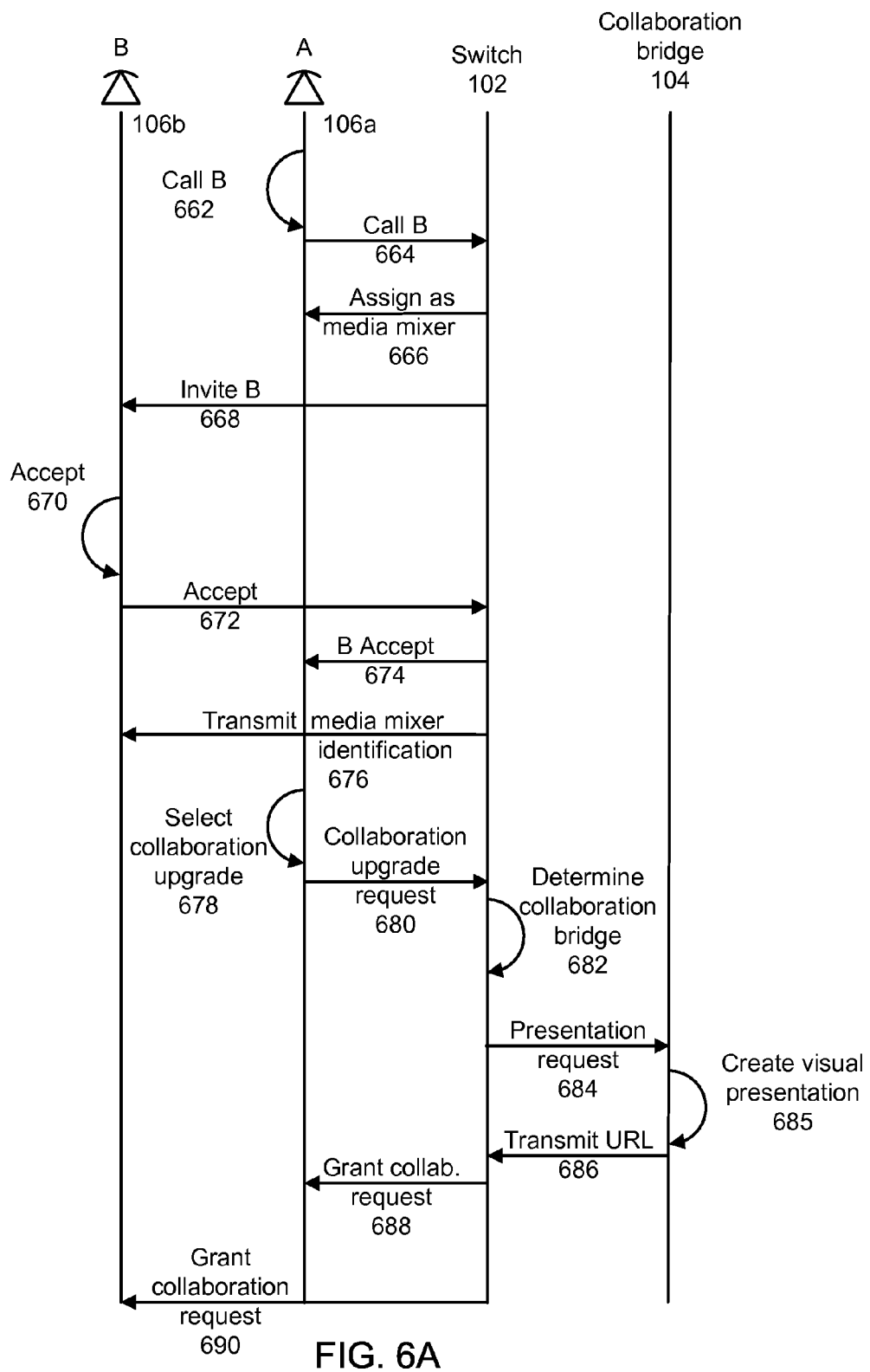
FIG. 6A is a trace diagram illustrating a method for upgrading a call to a collaborated session according to one embodiment of the invention.

FIG. 6A is a trace diagram illustrating a method for upgrading a call to a collaborated session according to one embodiment of the invention. In one embodiment, the user of endpoint 106a call the user of endpoint 106b, both endpoints 106a-b are connected to each other on the call and then endpoint 106a requests that the switch 102 upgrade the call to a collaboration call. In another embodiment, the user through endpoint 106a joins a conference call and requests an upgrade before endpoint 106b joins the conference call. In yet another embodiment, the user through endpoint 106a directly requests a collaboration call before connecting to another user's endpoint 106b. Accordingly, the timing of the upgrade request or a collaboration call request in the illustrated method is not limited by the timing of one or more participating endpoints 106 joining the call. Moreover, the method described below in description of FIG. 6A illustrates participating endpoints 106a-b upgrading a one-to-one call to a collaboration call. One of ordinary skill in the art will realize that other calls like a conference call can also be upgraded to a collaboration call using similar steps as illustrated below.

Returning to FIG. 6A, the user of endpoint 106a request 662 a call by dialing on endpoint 106a the phone number associated with endpoint 106b. The endpoint controller 202 receives the request and transmits 664 the request to switch 102. The switch 102 receives the request and assigns 666 endpoint 106a as the media mixer for the call. Alternatively, switch 102 assign another entity in system 100 as the media mixer.

Next, the switch 102 transmits 668 an invite to endpoint 106b for joining the call initiated by endpoint 106a. A user of second endpoint 106b accepts the call and endpoint 106b consequently receives 670 an accept signal. In response, the endpoint 106b transmits 672 a corresponding accept signal to switch 102 and switch 102 transmits 674 a signal to endpoint 106a notifying the endpoint 106a that endpoint 106b has accepted the call. The switch 102 then transmits 676 the identity of media mixer for the call to endpoint 106b and the call between the two endpoints 106a-b is setup. The endpoints 106a-b are then engaged in the call and both the endpoints 106a-b display an interface 900b like the interface illustrated in FIG. 9B. The interface 900b includes an upgrade option 906f that can be selected by pressing the corresponding key 908a, an invite option 906g that can be selected by pressing the corresponding key 908b, an invite and authentication option 906h that can be selected by pressing the corresponding key 908c, a hold option 906d that can be selected by pressing the corresponding key 908d and a disconnect option 906e that can be selected by pressing the corresponding key 908e.

At some point in the call, the user of endpoint 106a decides to upgrade the call to a collaboration call. One of ordinary skill in the art will understand that any user associated with the call may upgrade the call and the user of endpoint 106a is one example of such a user. To upgrade the call, the user of endpoint 106a selects the key 908a corresponding to the upgrade option 906f on user interface of endpoint 106a. The endpoint controller 202 receives 678 the user's upgrade request through endpoint UI module 210 and transmits 680 the upgrade request to switch 102. In one embodiment, the user enters the number for conference call and the number is transmitted 680 with the conference call request to switch 102. In another embodiment, the endpoint 106a is pre-configured with a conference call number and the pre-configured number is transmitted 680 with the conference call request to switch 102. In yet another embodiment, the switch 102 is pre-configured with the collaboration call number and the endpoint controller 202 need not transmit a pre-configured collaboration call number. The switch controller 302 in switch 102 receives the upgrade request and determines 682 a collaboration bridge 104 for the request. The steps for determining the collaboration bridge 104 are similar to the step for determining the collaboration bridge 104 described in FIG. 5.

After determining the collaboration bridge 104, the switch controller 302 transmits 684 a request for a visual presentation to the collaboration bridge 104. The call upgrade bridge module 404 in collaboration bridge 104 receives the request and requests the collaboration presentation bridge module 406 for a visual presentation. The collaborated presentation bridge module 406 creates 685 the visual presentation and transmits the link, for example a URL, for the presentation to collaboration bridge controller 402. The collaboration bridge controller 402 then transmits the received link to switch 102. The switch controller 302 in switch 102 receives the link and transmits 688-690 a grant signal to endpoint 106a and endpoint 106b. In one embodiment, the endpoints 106a-b receive the grant signals and indicate to their users through their interfaces that a visual presentation associated with the call is now available on the associated call managers 108a-b. In another embodiment, the endpoint 106b includes the call managers 108b and display visual presentation directly instead of indicating that the presentation is now available.

Figure 6B:
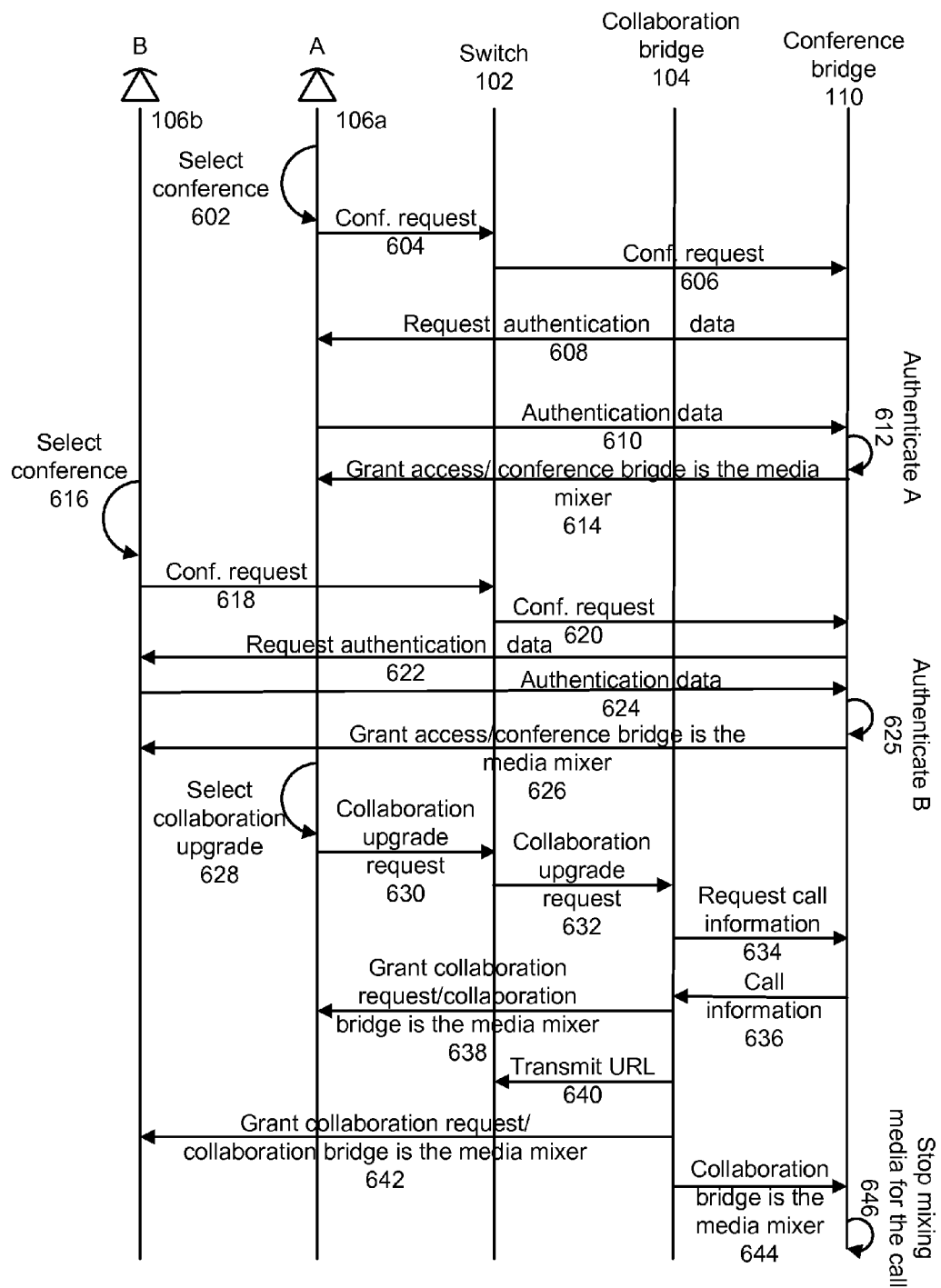
FIG. 6B is a trace diagram illustrating a method for upgrading a conference call hosted by a conference bridge to a collaboration call according to one embodiment of the invention.

FIG. 6B is a trace diagram illustrating a method for upgrading a conference call hosted by a conference bridge 110 to a collaboration call according to one embodiment of the invention. In the illustrated embodiment, the collaboration bridge 104 becomes the media mixer after endpoint 106a requests to upgrade the conference call to a collaboration call. In another embodiment, the collaboration bridge 104 does not take over the media mixing responsibilities from the conference bridge 110. In yet another embodiment, the collaboration bridge 104 assigns another entity in system 100 to take over the media mixing responsibilities.

The method of FIG. 6B begins when a user of endpoint 106a presses the key 908a, illustrated in FIG. 9A, corresponding to the conference call feature 906a displayed on endpoint 106a. The endpoint controller 202 receives 602 the conference call selection and transmits the request to switch 102. In one embodiment, the endpoint 106a receives from the user the conference call number and the number is transmitted 604 with the conference call request to switch 102. In another embodiment, the endpoint 106a is pre-configured with the conference call number and the pre-configured number is transmitted 604 with the conference call request to switch 102. Accordingly, in this embodiment, the user does not enter a conference call number and initiates a conference call by just selecting key 908a.

The switch controller 302 receives the conference request and determines the conference bridge 110 for the request. In one embodiment, the switch 102 is pre-configured with the conference bridge 110 for hosting conference calls for the switch 102. In another embodiment, the switch controller 302 receives the amount of available resources on one or more conference bridges 110 and determines the conference bridge 110 with optimum resources as the conference bridge 110 for handling the received request.

After determining the conference bridge 110, the switch controller 302 transmits 606 the conference request to the determined conference bridge 110. In one embodiment, the switch controller 302 also transmits an identification string for the requesting endpoint 106a with the conference request. The conference bridge 110 receives the request and optionally the identification string for endpoint 106a and transmits 608 a request for authentication data to endpoint 106a. In one embodiment, one or more signals between conference bridge 110 and endpoints 106a-b are transmitted through switch 102 and switch 102 determines the appropriate recipient for the signal. In another embodiment, the conference bridge 110 and endpoints 106a-b exchange signals directly with each other. In yet another embodiment, the conference bridge 110 and endpoints 106a-b exchange some signals like call setup signals through switch 102 and some signals like media data directly.

Regardless of whether the endpoint 106a receives the request for authentication data through switch 102 or directly from conference bridge 110, the endpoint controller 202 transmits 610 the authentication data to conference bridge 110. In one embodiment, the endpoint controller 202 receives the authentication data from the user through endpoint UI module 210. In another embodiment, the endpoint 106a is pre-configured. The endpoint controller 202 transmits the authentication data, pre-configured or received from the user, to conference bridge 110. The conference bridge 110 receives the authentication data and authenticates 612 endpoint 106a based on the received authentication data. The conference bridge 110 then transmits 614 to endpoint 106a grant and a signal informing endpoint 106a that the conference bridge 110 would be mixing media for the call.

Next, a second endpoint 106b joins the call and steps 616-626 are implemented to join endpoint 106b to the call. Steps 616-626 for endpoint 106a are similar to steps 602-614 described above. Those skilled in the art will recognize that any number of additional endpoints could be authenticated even though only a second is shown. In one embodiment, participants can join the conference call without authentication and therefore steps 608-612 and 622-625 are skipped.

After endpoints 106a-b have joined the call, user interface like the user interface illustrated in FIG. 9B is displayed on endpoints 106a-b. One of ordinary skill in the art will understand that interfaces similar to interfaces 900a-c illustrated in FIGS. 9A-C can also be provided on the call managers 108a-b and the users of endpoints 106a-b can select a desired feature from the call managers 108a-b instead of the endpoints 106a-b. For example, an analog endpoint 106 may not provide the user interfaces illustrated in FIGS. 9A-C. In such a case, the user interfaces are provided on the call managers 108a-b associated with the analog endpoint 106. Returning to FIG.

9B, the user of endpoint 106a selects key 908a corresponding to the upgrade option 906f and the endpoint controller 202 receives 628 the upgrade request through endpoint UI controller 210. The endpoint controller 202 then transmits 630 the upgrade request to switch 102 and switch 102 transmits 632 the upgrade request to the appropriate collaboration bridge 104. In one embodiment, switch 102 is pre-configured with a collaboration bridge 104 for hosting the collaboration session for switch 102. In another embodiment, switch 102 receives from one or more collaboration bridges 104 in system 100 their available resources and the switch 102 selects the collaboration bridge 104 with optimum resources for the collaboration session.

Regardless of how the collaboration bridge 104 is determined, the collaboration bridge controller 402 in the determined collaboration bridge 104 receives the collaboration upgrade request and forwards the request to the call upgrade bridge module 404. The call upgrade bridge module 404 then transmits 634 a request for identification string of participating endpoints 106a-b to the conference bridge 110. Consequently, the conference bridge 110 transmits 636 the identification string to call upgrade bridge module 404.

Next, the call upgrade bridge module 404 requests the collaborated presentation bridge module 406 and the collaborated presentation bridge module 406 creates a visual presentation for the collaborated call. The call upgrade bridge module 404 receives the link to the created presentation and transmits the link with the determined identification strings of participating endpoints 106a-b to the collaboration bridge controller 402. The collaboration bridge controller 402 receives the determined identification strings and the link to the created presentation and transmits 638 a grant to endpoint 106a. In one embodiment, the endpoint 106a displays an indication to user informing the user that the collaborated session has been granted. Additionally, in one embodiment, in addition to providing the visual presentation for the collaboration call, the collaboration bridge 104 also takes over the media mixing responsibilities upon receiving a call upgrade request. In such an embodiment, the collaboration bridge controller 402 also transmits 638 a signal informing the endpoint 106a that the collaboration bridge 104 is the new media mixer for the call. Additionally, the collaboration bridge controller 402 transmits 640 the link for the created visual presentation to switch 102 which in turn transmits the link to the call managers 108a-b associated with endpoints 106a-b. The collaboration bridge controller 402 also transmits 642 to endpoint 106b the grant signal and a signal informing endpoint 106b that collaboration bridge 104 is the new media mixer. Next, the collaboration bridge controller 402 transmits 644 a signal to conference bridge 110 informing the conference bridge 110 that collaboration bridge 104 is the new media mixer. The conference bridge 110 then stops 646 mixing media for the call.

FIGS. 6A-B illustrate embodiments of a method implemented by system 100 to upgrade an in-progress call to a collaboration session using the interface available on the endpoints 106a-b or the associated call managers 108a-b. Accordingly, call participants need not setup independent or incompatible solutions for a visual presentation and a voice call. Instead, the call participants can beneficially use the disclosed system 100 to start a visual presentation associated with a call in progress using the endpoints 106a-b or the call managers 108a-b.

Permissions Transfer Methodology

Figure 7:
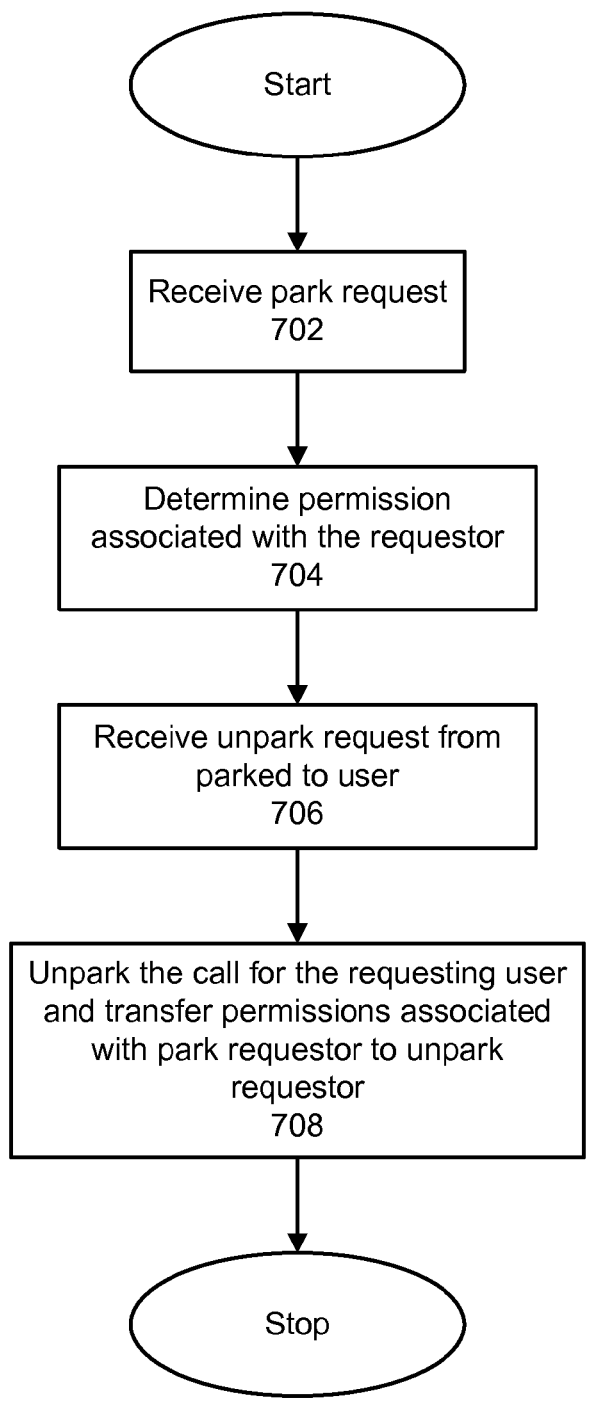
FIG. 7 is a flow chart illustrating a method for transferring permissions with a call when the call is parked and unparked according to one embodiment of the invention.

After a conference call or a collaboration call is set up, one or more participants can continue their call on an endpoint 106 other than the endpoint 106 where they started the call. The participants can use the park feature to switch their call to another endpoint 106. FIG. 7 is a flow chart illustrating a method for transferring permissions with a call when the call is parked and unparked according to one embodiment of the invention. The user of endpoint 106a presses key 908c on user interface illustrated in FIG. 9A to park the call on another endpoint 106. In one embodiment, the user also enters a phone number or an extension number where the call should be parked. In another embodiment, the extension number is pre-configured in endpoint 106a. The call park endpoint module 212 in endpoint 106 receives the park request and transmits the request to switch 102.

The call park switch module 310 receives 702 the park request and queries 704 the permissions database 314 to determine the permissions associated with the requesting endpoint 106a or with the user of endpoint 106a. The user then selects a key (not shown) on a second endpoint 106b where the call should be unparked. The second endpoint 106b transmits the unpark request to switch 102 and the call park switch module 310 receives 706 the unpark request from the second endpoint 106b. The call park switch module 310 then unparks 708 the call at the second endpoint 106b from the first endpoint 106a and associates with the second endpoint 106b the permissions previously associated with the endpoint 106a.

A method similar to the method illustrated in FIG. 7 can be used for transferring permissions or a collaboration session associated with a call when the call is transferred from one endpoint 106 to another according to one embodiment of the invention. The call park switch module 310 or a transfer module (not shown) receives the transfer request and queries the permissions database 314 to determine the permissions or a link to the collaboration session associated with the requesting endpoint 106a or with the user of endpoint 106a. The call park switch module 310 or the transfer module then transfers the call at the second endpoint 106b from the first endpoint 106a and associates with the second endpoint 106b the permissions previously associated with the endpoint 106a. Additionally, if a collaboration session is associated with the call, the call park switch module 310 or the transfer module stores the link when the link is first created and transmitted by the collaboration bridge 104. As part of the transfer, the call park switch module 310 or the transfer module transmits the stored link for the associated collaboration session to the call manager 108b associated with the endpoint 106b.

Accordingly, the disclosed system 100 provides a convenient method for transferring permissions with a transferred or parked call. The call participants are not anymore hindered by lack of a particular permission that was associated with the parking or transferring endpoint 106 but not with the endpoint 106 receiving the transferred or unparked call.

User Interface Update Methodology

Figure 8:
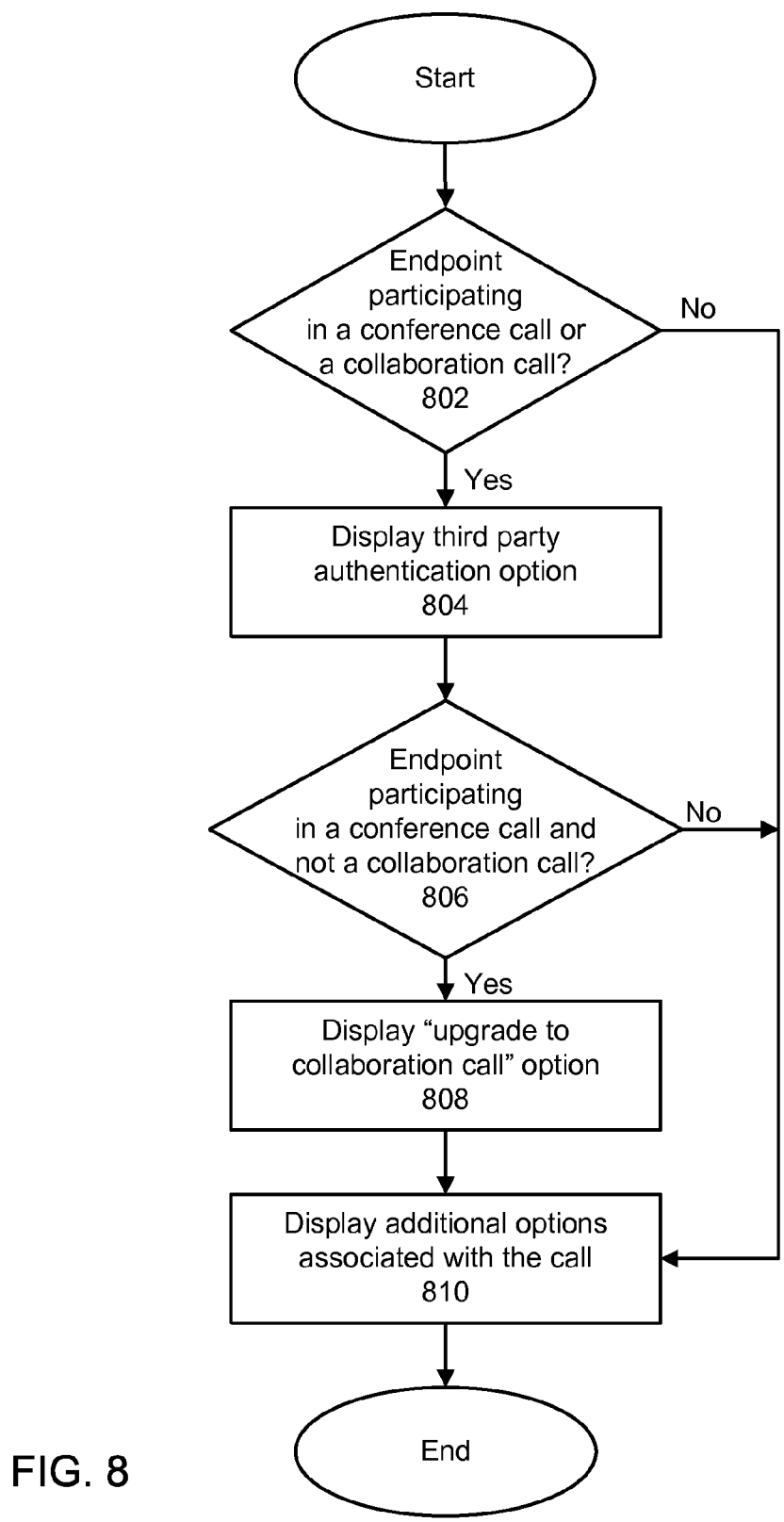
FIG. 8 is a flow chart illustrating a method for updating the user interface for upgrading a call to a collaboration call according to one embodiment of the invention.

FIG. 8 is a flow chart illustrating a method for updating the user interface on an endpoint 106 according to one embodiment of the invention. The endpoint controller 202 transmits a signal to endpoint UI module 210 when the endpoint 106 receives a grant to join the conference call or collaboration call. The endpoint UI module 210 receives the signal from endpoint controller 202 and determines 802 if the endpoint 106 is participating in a conference call or collaboration call. If the endpoint 106 is participating in a normal call and not participating in a conference call or a collaboration call, endpoint UI module 210 displays 810 call features like hold 906d and disconnect 906e illustrated in FIG. 9A. Again, the functionality of the endpoint controller 202 and endpoint UI module 210 imputes intelligence to endpoints 106a-c. This description is for illustration purposes and in some embodiments, such functionality is implemented at switch 102 or another entity in system 100.

If the endpoint 106 is participating in a conference call or a collaboration call, the endpoint UI module 210 displays 804 call features like invite 906g and invite & authenticate 906h as illustrated in FIGS. 9B-C. The endpoint UI module 210 then determines if the endpoint 106 is participating in a conference call. If the endpoint 106 is participating in a conference call, the endpoint UI module 210 displays 808 an upgrade option 908a that allows a user to upgrade the conference call to a collaboration call. Otherwise, the endpoint UI module 210 displays 810 call features like hold 906d and disconnect 906e illustrated in FIG. 9A.

What is claimed is:

1. A method for creating a collaboration call including an associated visual presentation, the method comprising:
   receiving a collaboration call request from a first endpoint;
   responsive to receiving the collaboration call request, determining a collaboration bridge for creating the visual presentation from a plurality of collaboration bridges based at least in part on the available resources of the collaboration bridge;
   subsequent to determining the collaboration bridge for creating the visual presentation, receiving from the first endpoint authentication data for a collaboration call;
   receiving, during the collaboration call, a request from the first endpoint to authenticate a second endpoint as another authorized participant of the collaboration call, wherein the request identifies the second endpoint;
   responsive to receiving the request from the first endpoint to authenticate the second endpoint, determining authentication data for the second endpoint;
   authenticating, by an authenticating entity, the second endpoint based on the determined authentication data;
   receiving a link for directing a user to the visual presentation from the determined collaboration bridge; and
   transmitting the link to a call manager associated with the first endpoint.

2. The method of claim 1 wherein the collaboration call request is received in response to a selection of a conference key on the first endpoint, and the collaboration call request is interpreted as a request to conference in another participant for the collaboration call.

3. The method of claim 1 wherein the collaboration call requires an authentication code from each participant for joining the collaboration call and an authentication code for the second endpoint is provided by the first endpoint.

4. The method of claim 1 wherein the collaboration call requires an authentication code from each participant for joining the collaboration call, and the first endpoint and the second endpoint each provide their own authentication code for the collaboration call.

5. The method of claim 1 further comprising, transmitting the link to a call manager associated with the second endpoint.

6. The method of claim 1 wherein a previous call is already in progress between the first endpoint and the second endpoint and the collaboration call request is received in response to an upgrade selected at the first endpoint.

7. The method of claim 1 wherein the first endpoint includes the call manager.

8. The method of claim 1 comprising transmitting a grant to the first endpoint wherein the grant indicates that the visual presentation is now available for the collaboration call.

9. The method of claim 1 wherein determining the collaboration bridge comprises selecting an optimum collaboration bridge from a plurality of collaboration bridges based on one or more available resources on the plurality of collaboration bridges, the one or more available resources including one or more of processing power, network bandwidth and memory.

10. The method of claim 1 wherein the collaboration bridge also mixes voice media for the first endpoint and the second endpoint after receiving the request for the visual presentation.

11. The method of claim 1 comprising transmitting a request for the presentation to the collaboration bridge.

12. A method for automatically determining authentication data for a call participant, the method comprising:
   receiving a call request from a first endpoint;
   determining a collaboration bridge for creating a visual presentation from a plurality of collaboration bridges based at least in part on the available resources of the collaboration bridge;
   receiving from the first endpoint authentication data for a call, the authentication data used to authenticate the first endpoint as an authorized participant of the call;
   receiving, during the call, a request from the first endpoint to authenticate a second endpoint as another authorized participant of the call, wherein the request includes authentication information that identifies the second endpoint and wherein the second endpoint is unidentified prior to receiving the request from the first endpoint to authenticate the second endpoint;
   determining authentication data based on the received authentication information for the second endpoint in response to receiving the request from the first endpoint;
   transmitting, by a switch, the determined authentication data for the second endpoint on behalf of the second endpoint to an authenticating entity;
   authenticating, by the authenticating entity, the second endpoint based on the determined authentication data;
   receiving a link to the visual presentation from the determined collaboration bridge; and
   transmitting the link to a call manager associated with the first endpoint.

13. The method of claim 12 wherein the determined authentication data for the second endpoint is same as the authentication data received from the first endpoint.

14. The method of claim 12 comprising:
   offering the call to the second endpoint in response to determining the authentication data for the second endpoint; and
   receiving a request to join the call from the second endpoint.

15. The method of claim 14 comprising receiving authentication data for the second endpoint from the second endpoint.

16. The method of claim 12 wherein the authenticating entity is a conference bridge.

17. The method of claim 12 wherein the authenticating entity is a collaboration bridge.

18. A method comprising:
   receiving a collaboration call request from a first endpoint, wherein the collaboration call request uses one or more of session initiation protocol (SIP), media gateway control protocol (MGCP) and H.323;
   responsive to receiving the collaboration call request, determining a collaboration bridge for creating a visual presentation from a plurality of collaboration bridges based at least in part on the available resources of the collaboration bridge;
   receiving from a first endpoint authentication data for a collaboration call, the authentication data used to authenticate the first endpoint as an authorized participant of the collaboration call;

receiving, during the collaboration call, a request from the first endpoint to authenticate a second endpoint as another authorized participant of the collaboration call, wherein the request includes authentication information that identifies the second endpoint and wherein the second endpoint is unidentified prior to receiving the request from the first endpoint to authenticate the second endpoint;

determining authentication data based on the received authentication information for the second endpoint in response to receiving the request to authenticate the second endpoint from the first endpoint;

transmitting, by a switch, the determined authentication data for the second endpoint on behalf of the second endpoint to an authenticating entity;

authenticating by the authenticating entity the second endpoint based on the determined authentication data;

receiving a link for directing a user to the visual presentation from the determined collaboration bridge; and transmitting the link for directing a user to a call manager associated with the first endpoint.

19. The method of claim 18 wherein the collaboration call request is received in response to a selection of a conference key on the first endpoint, and the collaboration call request is interpreted as a request to conference in another participant for the call.

20. The method of claim 18 wherein a previous call is already in progress between the first endpoint and the second endpoint and the collaboration call request is received in response to an upgrade selected at the first endpoint.

21. The method of claim 18 further comprising:
transmitting a grant to the first endpoint wherein the grant indicates that the visual presentation is now available for the collaboration call.

22. The method of claim 18 wherein determining the collaboration bridge comprises selecting an optimum collaboration bridge from a plurality of collaboration bridges based on one or more available resources on the plurality of collaboration bridges, the one or more available resources including one or more of processing power, network bandwidth and memory.

23. The method of claim 18 wherein the collaboration bridge also mixes voice media for the first endpoint and the second endpoint after receiving the request for the visual presentation.

24. The method of claim 18 wherein the determined authentication data for the second endpoint is same as the authentication data received from the first endpoint.

25. The method of claim 18 further comprising:
offering the collaboration call to the second endpoint in response to determining the authentication data for the second endpoint; and
receiving a request to join the call collaboration from the second endpoint.

26. A method comprising:
receiving a call request from a first endpoint;
determining a collaboration bridge for creating a visual presentation from a plurality of collaboration bridges based at least in part on the available resources of the collaboration bridge;
receiving from the first endpoint authentication data for the call, the authentication data used to authenticate the first endpoint as an authorized participant of the call;
receiving a request from the first endpoint to authenticate a second endpoint as another authorized participant of the call;
determining authentication data for the second endpoint in response to receiving the request from the first endpoint; and
authenticating the second endpoint based on the determined authentication data
receiving a link to the visual presentation from the determined collaboration bridge; and
transmitting the link to a call manager associated with the first endpoint.

27. The method of claim 26 further comprising:
transmitting the determined authentication data for the second endpoint on behalf of the second endpoint.

28. The method of claim 26 wherein the call request uses one or more of session initiation protocol (SIP), media gateway control protocol (MGCP) and H.323.

29. The method of claim 26 wherein the call request is received in response to a selection of a conference key on the first endpoint, and the call request is interpreted as a request to conference in another participant for the call.

30. The method of claim 26 wherein a previous call is already in progress between the first endpoint and the second endpoint and the call request is received in response to an upgrade selected at the first endpoint.

31. The method of claim 26 further comprising:
transmitting a grant to the first endpoint wherein the grant indicates that the visual presentation is now available for the call.

32. The method of claim 26 wherein determining the collaboration bridge comprises selecting an optimum collaboration bridge from a plurality of collaboration bridges based on one or more available resources on the plurality of collaboration bridges, the one or more available resources including one or more of processing power, network bandwidth and memory.

33. The method of claim 26 wherein the collaboration bridge also mixes voice media for the first endpoint and the second endpoint after receiving the request for the visual presentation.

34. The method of claim 26 wherein the determined authentication data for the second endpoint is same as the authentication data received from the first endpoint.

* * * * *